United States Patent
Sautto et al.

(10) Patent No.: US 12,489,446 B2
(45) Date of Patent: Dec. 2, 2025

(54) ARBITER FOR NON-PERSISTENT SIGNALS

(71) Applicant: RENESAS ELECTRONICS AMERICA INC., Milpitas, CA (US)

(72) Inventors: Marco Sautto, Zurich (CH); Danil Sokolov, Swindon (GB); Robert Waterworth, Swindon (GB); Victor Khomenko, Swindon (GB)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 181 days.

(21) Appl. No.: 18/454,271

(22) Filed: Aug. 23, 2023

(65) Prior Publication Data
US 2025/0070784 A1 Feb. 27, 2025

(51) Int. Cl.
*H03K 19/20* (2006.01)
*H03K 3/037* (2006.01)

(52) U.S. Cl.
CPC ............. *H03K 19/20* (2013.01); *H03K 3/037* (2013.01)

(58) Field of Classification Search
CPC .... H03K 19/0002; H03K 19/20; H03K 3/027; H03K 3/037; H03K 5/15; H03K 5/15013; H03K 5/15026; G06F 13/1605; G06F 13/36; G06F 13/4031
See application file for complete search history.

(56) References Cited

U.S. PATENT DOCUMENTS

| | | | | |
|---|---|---|---|---|
| 5,805,838 A | * | 9/1998 | Sutherland | G06F 13/364 710/118 |
| 10,581,435 B1 | * | 3/2020 | Sokolov | H03K 19/20 |
| 11,494,315 B1 | * | 11/2022 | Janssens | H03K 19/20 |
| 2008/0215785 A1 | * | 9/2008 | Satani | G06F 5/12 710/241 |
| 2012/0106334 A1 | * | 5/2012 | Tanaka | H04L 47/10 370/230 |
| 2013/0326100 A1 | * | 12/2013 | Bacigalupo | G06F 13/364 710/240 |
| 2014/0281086 A1 | * | 9/2014 | Bacigalupo | G06F 13/14 710/240 |
| 2023/0238969 A1 | * | 7/2023 | Gonsholt | H03L 7/14 331/172 |
| 2024/0313748 A1 | * | 9/2024 | Qadir | H03K 3/0375 |
| 2025/0070784 A1 | * | 2/2025 | Sautto | H03K 19/20 |

* cited by examiner

*Primary Examiner* — Jason M Crawford
(74) *Attorney, Agent, or Firm* — SCULLY, SCOTT, MURPHY & PRESSER, P.C.

(57) ABSTRACT

Systems and devices for signal arbitration are described. A first asynchronous circuit can receive and sanitize a first non-persistent signal representing a first request to generate a first persistent signal. A second asynchronous circuit can receive and sanitize a second non-persistent signal representing a second request to generate a second persistent signal. A mutual exclusive circuit can arbitrate between the first persistent signal and the second persistent signal and output a grant signal to issue a grant. A control circuit can control an operation mode of the first and second asynchronous circuits based on a control signal, a first grant signal indicating a grant status of the first request, a second grant signal indicating a grant status of the second request, the first persistent signal and the second persistent signal.

18 Claims, 16 Drawing Sheets

331

350

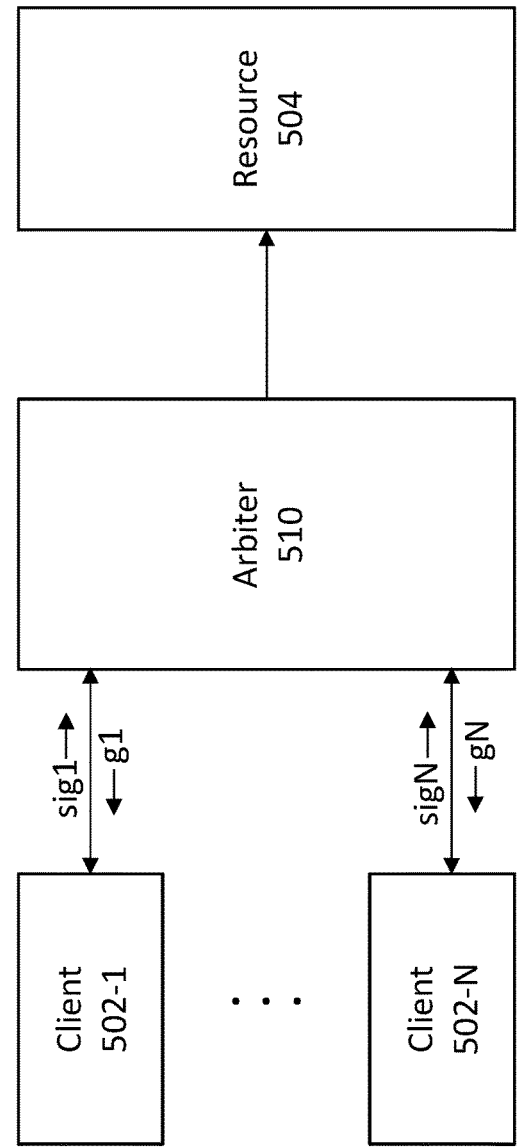

US 12,489,446 B2

1
ARBITER FOR NON-PERSISTENT SIGNALS

BACKGROUND OF THE SPECIFICATION

The present disclosure relates a reusable asynchronous component that implements an arbitration element, or an arbiter, to select a signal among multiple signals for processing in a computing system. The multiple signals can be non-persistent signals, such as analog signals outputted by analog circuits.

An arbitration circuit, or an arbiter, can be used for arbitrating multiple requests from multiple clients. At least one of the multiple clients can concurrently send respective requests to the arbiter. The arbiter can issue a grant to a specific client among the multiple clients to fulfill the request submitted by the specific client. At most one grant can be issued by the arbiter at any time, regardless of how many concurrent requests have been received by the arbiter. If the grant is issued to the specific client, the other clients cannot interfere and no further grants will be issued until a task associated with the issued grant is complete. Having completed the task associated with the issued grant, the specific client can withdraw its request, the arbiter can withdraw the issued grant, and the arbiter can perform arbitration again to issue a grant to another client among the clients that submitted requests.

SUMMARY OF THE INVENTION

In one embodiment, a semiconductor device for signal arbitration is generally described. The semiconductor device can include a first asynchronous circuit configured to receive a first non-persistent signal representing a first request. The first asynchronous circuit can be further configured to sanitize the first non-persistent signal to generate a first persistent signal. The semiconductor device can include a second asynchronous circuit configured to receive a second non-persistent signal representing a second request. The second asynchronous circuit can be further configure to sanitize the second non-persistent signal to generate a second persistent signal. The semiconductor device can further include a mutual exclusive (MUTEX) circuit configured to arbitrate between the first persistent signal and the second persistent signal. The MUTEX circuit can be further configured to output a grant signal to issue a grant to one of the first request and the second request. The semiconductor device can further include a control circuit configured to control an operation mode of the first asynchronous circuit and the second asynchronous circuit based on a control signal, a first grant signal indicating a grant status of the first request, a second grant signal indicating a grant status of the second request, the first persistent signal and the second persistent signal.

In one embodiment, a system for signal arbitration is generally described. The system can include a first client, a second client, a resource and an arbiter. The arbiter can include a first asynchronous circuit configured to receive a first non-persistent signal representing a first request from the first client and sanitize the first non-persistent signal to generate a first persistent signal. The arbiter can further include a second asynchronous circuit configured to receive a second non-persistent signal representing a second request from the second client and sanitize the second non-persistent signal to generate a second persistent signal. The arbiter can further include a mutual exclusive (MUTEX) circuit configured to arbitrate between the first persistent signal and the second persistent signal and output a grant signal to grant one of the first client and the second client to access the resource. The arbiter can further include a control circuit configured to control an operation mode of the first asynchronous circuit and the second asynchronous circuit based on a control signal, a first grant signal indicating a grant status of the first request, a second grant signal indicating a grant status of the second request, the first persistent signal and the second persistent signal.

In one embodiment, a semiconductor device for signal arbitration is generally described. The semiconductor device can include N first asynchronous circuit configured to receive N non-persistent signals representing N requests and sanitize the N non-persistent signals to generate N persistent signals. The semiconductor device can further include a mutual exclusive (MUTEX) circuit configured to arbitrate among the N persistent signals and output a grant signal to issue a grant to one of the N requests. The semiconductor device can include a control circuit configured to control an operation mode of the N asynchronous circuits based on a control signal, N grant signals indicating grant status of the N requests and the N first persistent signals. The control circuit can include a NAND gate configured to receive an inverse of the control signal and the N persistent signals as inputs, a C-element configured to receive the control signal and an output of the NAND gate as inputs, and N multi-level logic gates configured to output N operation mode control signals to control the N asynchronous circuits.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 5 is a diagram showing a system that can implement an arbiter for non-persistent signals in one embodiment.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1A:
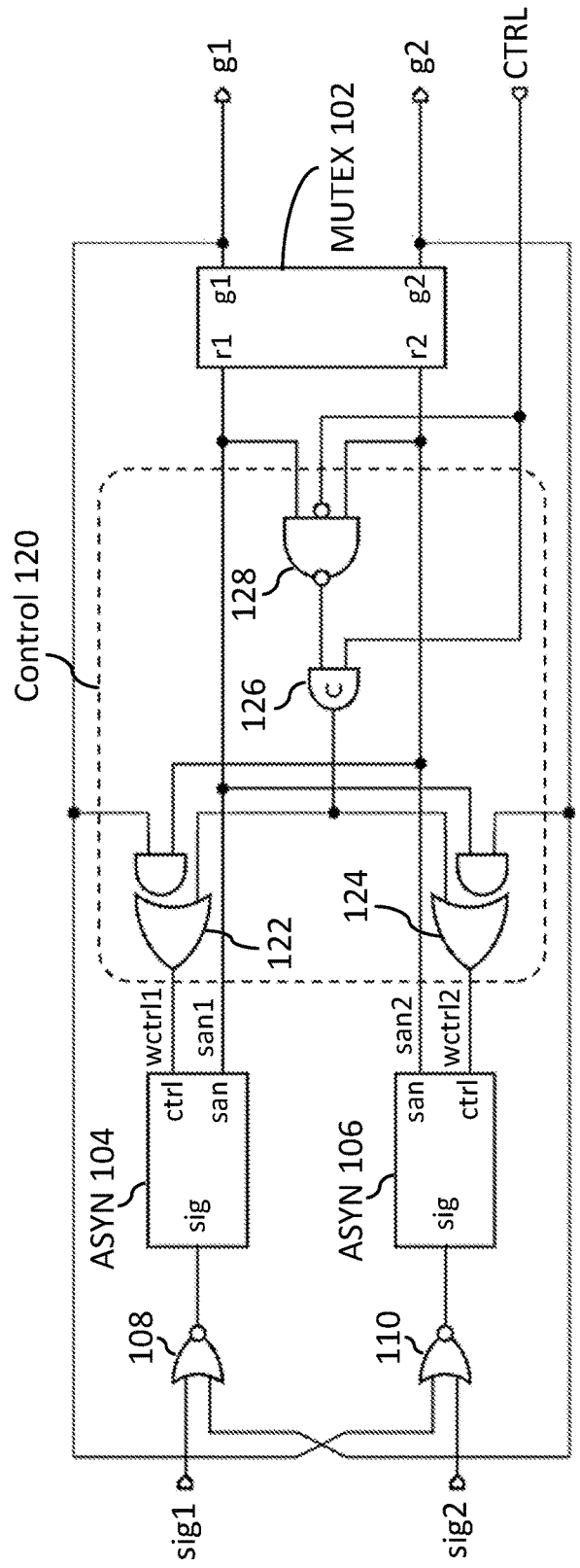
FIG. 1A is a diagram showing a circuit that can implement an arbiter for non-persistent signals in one embodiment.

FIG. 1A is a diagram showing a circuit that can implement an arbiter for non-persistent signals in one embodiment. Circuit 100 shown in FIG. 1A can be implemented by a semiconductor device. Circuit 100 can be an arbitration circuit, or an arbiter, that can be configured to arbitrate between two requests represented by signals sig1 and sig2. In the embodiment shown in FIG. 1A, arbiter 100 can include a mutual exclusive (MUTEX) circuit 102, at least one asynchronous circuit, such as asynchronous circuits ("ASYN") 104, 106, a pair of NOR gates 108, 110, and a control circuit 120.

By way of example, arbiter 100 can be used for arbitrating two requests from two clients using a shared resource in a mutually exclusive way. Before accessing the shared resource, a first client can send sig1 to arbiter 100 and the second client can concurrently send sig2 to arbiter 100 to request access to the shared resource. Arbiter 100 can issue a grant to grant access of the shared resource to one of sig1 and sig2. If the grant is issued to sig1, then arbiter 100 can rise (e.g., transition from logic low to logic high) a grant signal g1 while keeping grant signal g2 low. If the grant is issued to sig2, then arbiter 100 can rise g2 while keeping g1 low. Hence, The grant signals g1 and g2 can be complementary, which reflects that arbiter 100 can grant at most one request at one time. If arbiter 100 issued grant to sig1, after the client that submitted sig1 accessed the shared resource, sig1 can be withdrawn by transitioning from high to low and arbiter 100 can withdraw the grant g1 by dropping g1 from high to low, and issue grant to the second client by rising g2.

MUTEX circuit 102 can be an asynchronous circuit configured to arbitrate between two signals received at pins r1 and r2 of MUTEX circuit 102. MUTEX circuit 102 can include two pins g1 and g2 for outputting grant signals g1 and g2 (e.g., same as g1 and g2 outputted by arbiter 100). Pins r1, r2, g1, g2 can be configured as input pins and output pins, such that MUTEX circuit 102 can be a two-way MUTEX circuit. If the two requests received at pins r1, r2 occur at the same time or within a defined metastability time window of each other, MUTEX circuit 102 can enter a metastable state. Under the metastable state, MUTEX circuit 102 can keep both grant pins g1, g2 low until the metastability is resolved. If the signal at pin r1 rises (e.g., transition from logic low to logic high) before the signal at pin r2 rises, then MUTEX circuit 102 can rise the grant signal at pin g1 (e.g., output logic high) and pin g2 is held at logic low. If the signal at pin r2 rises before the signal at pin r1 rises, then MUTEX circuit 102 can rise the signal at pin g2 and g1 is held at logic low.

In an aspect, some conventional arbiters are configured to process requests represented by persistent or well-behaved signals, such as purely digital signals and signals representing requests that will not be withdrawn prematurely (e.g., before the arbitration is completed and the corresponding grant is issued). However, arbiters for processing well-behaved request signals can be restrictive because they may not be suitable to process requests produced by analog circuitry. For example, requests that are outputs of voltage comparators implemented using differential amplifiers can include undesirable short pulses generated due to noise if the voltages being compared are relatively close (e.g., comparator input voltage relatively small). Such requests produced by analog circuitry can be referred to as dirty or non-persistent signals.

In one embodiment, signals sig1 and sig2 received by arbiter 100 can be non-persistent signals (e.g., opposite from well-behaved signals), where these non-persistent signals can be withdrawn at any moment, have hazards (e.g., glitches, high-frequency bursts and jitters), signals produced by analog circuitry (e.g., voltage comparators), or other signals that considered as dirty or not clean, or not purely digital signals. Further, sig1 and sig2 can change their values at any time without any restrictions.

To arbitrate non-persistent signals, asynchronous circuits 104, 106 can be implemented with MUTEX circuit 102 to clean or sanitize non-persistent signals sig1 and sig2 prior to arbitration is performed by MUTEX circuit 102. In an aspect, asynchronous circuits 104, 106 can prevent hazards (e.g., glitches, undesired pulses, etc.) in non-persistent signals from being propagated to the r1 and r2 pins of MUTEX circuit 102. Further, asynchronous circuits 104, 106 can also be configured for processing persistent or well-behaved signals, such that arbiter 100 can arbitrate both persistent (well behaved) and non-persistent signals.

Asynchronous circuits 104, 106 can be configured to sanitize signals sig1, sig2 output persistent or sanitized signals san1, san2, respectively. MUTEX circuit 102 can receive sanitized signal san1 from asynchronous circuit 104 at the input pin r1, and can receive sanitized signal san2 from asynchronous circuit 106 at the input pin r2. MUTEX circuit 102 can arbitrate between sanitized signals san1 and san2. Each one of asynchronous circuits 104, 106 can include input pins labeled as sig and ctrl and an output pin labeled as san. The sig pin can receive persistent or non-persistent input signals that need to be arbitrated such as signals sig1 and sig2. The ctrl input pin can receive a control signal, such as wcrtrl1 for asynchronous circuit 104 and wcrtrl2 for asynchronous circuit 106. The san output pin can output a sanitized signal, such as san1 from asynchronous circuit 104 and san2 form asynchronous circuit 106.

If a rising transition (e.g., from low to high) occurs at the CTRL pin of arbiter 100, control signals wctrl1 and wctrl2 can also have a rising transition and ctrl pins of asynchronous circuits 104, 106 can experience a rising transition as well. In response the ctrl pins of asynchronous circuits 104, 106 experiencing a rising transition, asynchronous circuits 104, 106 can operate in waiting mode. If a falling transition (e.g., from high to low) occurs at the CTRL pin of arbiter 100, control signals wctrl1 and wctrl2 can also have a falling transition and ctrl pins of asynchronous circuits 104, 106 can experience a falling transition as well. In response to the ctrl pins of asynchronous circuits 104, 106 experiencing a falling transition, asynchronous circuits 104, 106 can operate in dormant mode where asynchronous circuits 104, 106 may remain idled and ignore signal events, such as rising and falling transition, at the sig pins.

Under the waiting mode, the asynchronous circuit (e.g., either asynchronous circuit 104 or 106) can wait for the signal at the sig input pin to experience a falling transition, cross a predefined threshold voltage, and stay below the predefined threshold voltage for a predefined amount of time. In one embodiment, asynchronous circuits 104 and 105 can wait for a 0 to come at the sig pin. Since NOR gates are connected to the sig pin, asynchronous circuits 104, 105 can latch san1=1 when sig1=1 and san2=1 when sig2=1. In one embodiment, the predefined threshold voltage can be VDD/2, where VDD can be a supply voltage being provided to arbiter 100 or to a system including arbiter 100. The absolute value of VDD can depend on the silicon process, spanning from 5V down to 0.5V in modern technologies. In response to the signal at the sig input pin being below the predefined threshold voltage for the predefined amount of time, the received signal at the sig pin can latch and the asynchronous circuit can rise the san pin. The wait for the sig input pin to stay below the predefined threshold voltage for the predefined amount of time can ensure that hazards such as short pulses, glitches and jitters would not trigger the san pin to rise, hence preventing such hazards to be propagated from the asynchronous circuit to MUTEX circuit 102. MUTEX circuit 102 can arbitrate between two clean or persistent signals san1 and san2, despite sig1 and sig2 being received by arbiter 100 being non-persistent signals.

In an aspect, each one of asynchronous circuits 104, 106 can be reset after a signal arrives at the sig pin and the arrived signal has been latched (e.g., being below the predefined threshold voltage for the predefined amount of time). In response to the signal at the sig pin being latched, the asynchronous circuit can reset by a falling transition of the ctrl pin (e.g., CTRL of arbiter 100 can transition to low). The reset can cause the ctrl pin and san pin to transition to low. Note that the san pin can be insensitive to sig pin in dormant mode. The asynchronous circuits 104, 106 can remain in dormant mode until their ctrl pins rise again to start the next cycle of arbitration.

The combination of MUTEX circuit 102 and asynchronous circuits 104, 106 can cause arbiter 100 to 1) issue grant g1 if sig1 has a rising transition before sig2 and sig1 stays above the predetermine threshold voltage long enough to be registered, and 2) issue grant g2 if sig2 has a rising transition before sig1 and sig2 stays above the predetermine threshold voltage long enough to be registered. The CTRL signal can go low to reset asynchronous circuits 104, 106 to indicate that the results of arbitration are no longer needed. The arbitration process can be repeated for zero or more times.

However, if the sig pin is not latched, then the asynchronous circuit may not reset. If the ctrl pin of the asynchronous circuits that is not latched is withdrawn (e.g., transition to low), then potentially a hazardous condition can occur where a request at its sig pin may arrive while the ctrl pin transits to low. When ctrl pin is low, the asynchronous circuit operates in dormant mode and can ignore an arriving signal at the sig pin. To address this potential hazardous condition, NOR gates 108, 110 can be implemented between the sig1 and sig2 pins and asynchronous circuits 104, 106, respectively. NOR gate 108 can receive the grant signal g2 and the input signal sig1 as inputs. NOR gate 110 can receive the grant signal g1 and the input signal sig2 as inputs. By way of example, if sig1 is a winning request, g1 can be high and when g1 is fed into NOR gate 110, the output of NOR gate 110 will be low or zero regardless of the sig2 signal value. Thus, the NOR gate 110 can drive low the sig pin of asynchronous circuit 106, allowing it to be latched to prepare for a next instance where wctrl2 goes low to end the current arbitration cycle.

Control circuit 120 can be a circuit that receives CTRL, san1, san2, g1 and g2 as inputs, and output control signals wctrl1 and wctrl2 to control asynchronous circuits 104, 106 based on the received inputs. Control circuit 120 can include two-level logic gates 122, 124, a C-element 126, and a two-level logic gate 128. The two-level logic gates 122, 124 can be 2-1 AND-OR (AO21) logic gates. The two-level logic gates 122, 124 can be configured to generate the control signals wctrl1 and wctrl2, respectively. Two-level logic gate 122 can receive g1, san2 and an output of C-element 126 as inputs and output the control signal wctrl1. Thus, the value of wctrl1 can be dependent on g1, san2 and the output of C-element 126. Two-level logic gate 124 can receive g2, san1 and the output of C-element 126 as inputs and output the control signal wctrl2. Thus, the value of wctrl2 can be dependent on g2, san1 and the output of C-element 126. The C-element 126 can be a binary logic circuit also known as the Muller C-element that can output a zero or low signal when all of its inputs are zero or low, and outputs one or high when all of its inputs are one or high, and otherwise retains its output state. The C-element 126 can receive the CTRL signal and an output of two-level logic gate 128 as inputs and generate its output for two-level logic gates 122, 124. The two-level logic gate 128 can be a NAND3 gate that takes three inputs that include an inverted value of CTRL, san1 and san2. Thus, the output of two-level logic gate 128 can be dependent on CTRL, san1 and san2.

In an aspect, the latency of some of the signal paths within arbiter 100 can be improved by implementing control circuit 120. Some of the signal paths that can benefit (e.g., improved or reduced latency) from implementation of circuit 120 can include 1) a critical signal path from a rising transition of CTRL to a rising transition of g1 (or g2) provided sig1 (or sig2) is high in advance, and 2) a critical signal path a rising transition of sig1 (or sig2) to a rising transition of g1 (or g2) provided CTRL is high in advance. These two critical signal paths corresponding to either the (sig1, g1) pair or the (sig2, g2) pair can be symmetric, hence share approximately the same latency. In an aspect, a latency of the signal paths can be measured as the number of gate delays along the signal path. Control circuit 120 includes relatively less logic gates than conventional arbiters, which reduces the number of gate delays and hence improve latency of the signal paths. The reduced number of logic gates also reduces a size of arbiter 100 when compared to conventional arbiters. In the embodiment shown in FIG. 1A, arbiter 100 includes nine gates or gate level components, which is relatively lower than conventional arbiters that can have, for example, at least twelve gates or gate level components. In one embodiment, MUTEX 102 can output grant signals g1, g2 directly without going through control circuit 120 to reduce latency.

Figure 1B:
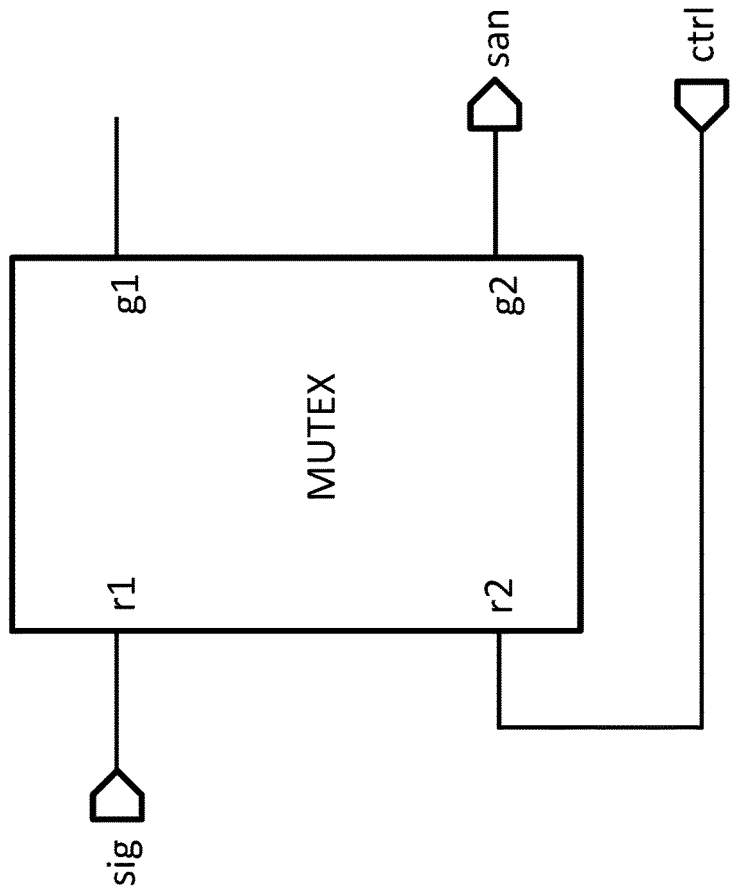
FIG. 1B is a diagram showing an example implementation of an asynchronous circuit in an arbiter for non-persistent signals in one embodiment.

FIG. 1B is a diagram showing an example implementation of an asynchronous circuit in an arbiter for non-persistent signals in one embodiment. In one embodiment, asynchronous circuits 104, 105 (and other similar asynchronous circuits described herein) can be implemented using a MUTEX circuit as shown in FIG. 1B. When a MUTEX circuit is being used for implementing the asynchronous circuits described herein, the r1 pin can be set as the sig pin, the r2 pin can be set as the ctrl pin, the g2 pin can be set as the san pin and the g1 pin can be left floating.

Figure 1C:
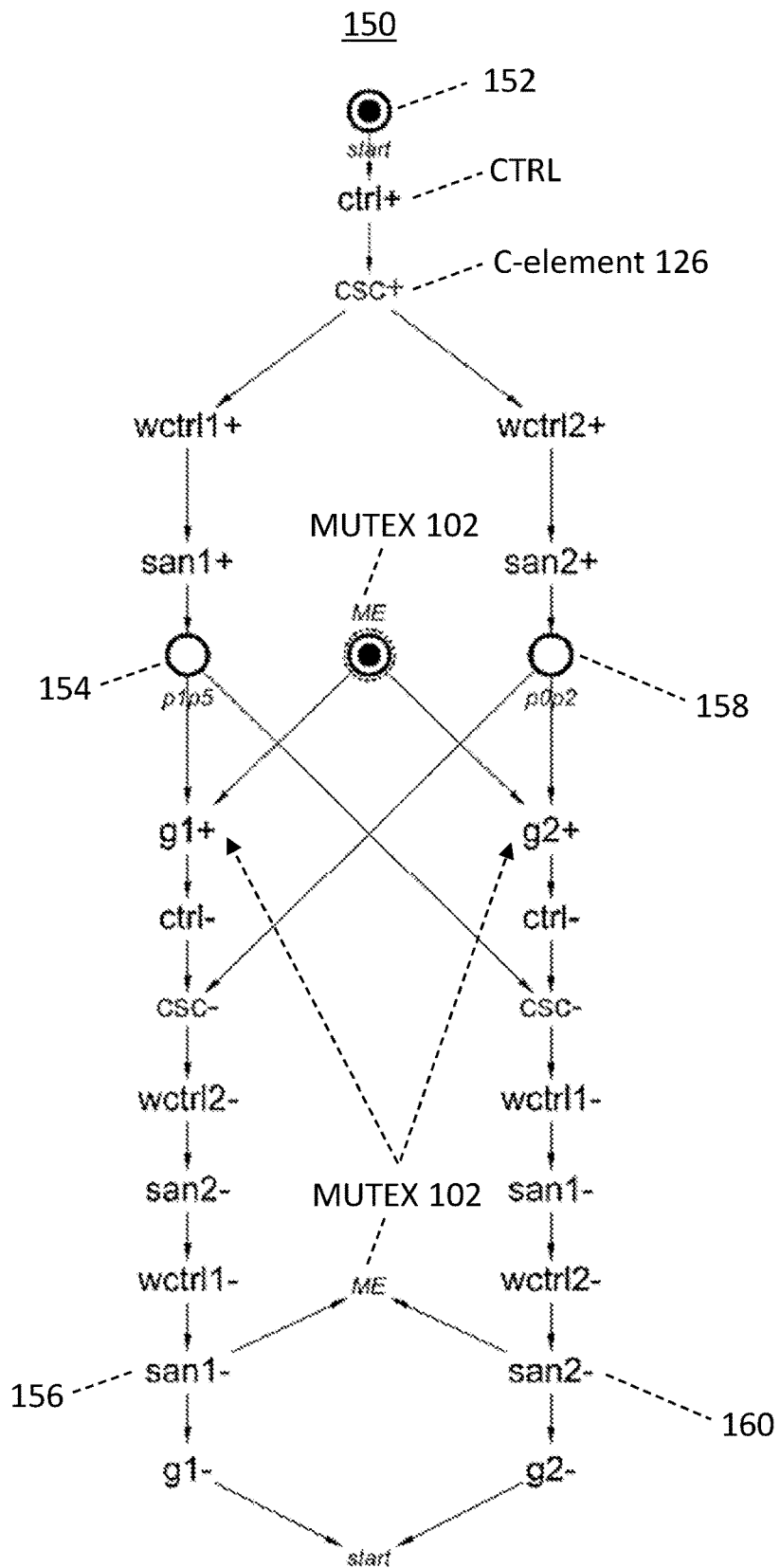
FIG. 1C is a diagram showing a signal transition graph of the circuit in FIG. 1A in one embodiment.

FIG. 1C is a signal transition graph showing signal transitions of the circuit in FIG. 1A in one embodiment. Descriptions of FIG. 1C can reference components that were shown in FIG. 1A. A signal transition graph (STG) 150 is shown in FIG. 1B, and STG 150 depicts signal transitions of arbiter 100 shown in FIG. 1A. In STG 150 (and other STGs described herein), a plus sign "+" can indicate a rising transition from low to high and a minus sign "−" can indicate a falling transition from high to low.

At a start 152, a cycle of arbitration can begin by rising CTRL (asserting ctrl+). The C-element 126 can be initialized to high by rising an output csc of C-element 126 (asserting csc+). In response asserting ctrl+ and csc+, control signals wctrl1 and wctrl2 can rise by asserting wctrl1+ and wctrl2+. In response to asserting wctrl1+ and wctrl2+, asynchronous circuits 104, 106 can operate in waiting mode and if their respective input signals sig are latched, asynchronous circuits 104, 106 can rise their san pins by asserting san1+ and san2+, respectively. In response to asserting san1+ and san2+, MUTEX circuit 102 can issue a grant, by either asserting g1+ or g2+. Assertion of g1+ can indicate that the sig1 request is granted and assertion of g2+ can indicate that the sig2 request is granted.

In response to asserting g1, CTRL can go low by asserting ctrl−. In response to asserting ctrl−, C-element 126 can also go low thus asserting csc−. In response to asserting ctrl− and csc−, the control signal associated with the losing request, which is wctrl2 in this case, can go low by asserting wctrl2−. The san pin associated with the losing request can also be asserted as san2−. In response to asserting wctrl2− and san2−, the ctrl and san pins associated with the wining request can also be asserted as wctrl1+ and san1−. The assertion of wctrl2− and san2− prior to wctrl1− and san1− can indicate that the asynchronous circuit associated with the losing request (e.g., asynchronous circuit 106 in this case) is reset prior to resetting the asynchronous circuit associated with the wining request (e.g., asynchronous circuit 104 in this case). After both asynchronous circuits 104, 106 are reset, the issued grant g1 can be withdrawn by asserting g1− and STG 150 can return to a next cycle of arbitration by returning to start 152.

In one embodiment, at a node 154, if san1+ is asserted but g1+ is not asserted, STG 150 can transition to assert csc− and wctrl1− and san1− are asserted prior to wctrl2− and san2−. In another embodiment, at a node 156, in response to asserting san1−, STG 150 can assert g1− and return to MUTEX circuit 102 to issue grant for the other request, which in this case is sig2+, g2+ can be asserted.

In response to asserting g2, CTRL can go low by asserting ctrl−. In response to asserting ctrl−, C-element 126 can also go low thus asserting csc−. In response to asserting ctrl− and csc−, the control signal associated with the losing request, which is wctrl1 in this case, can go low by asserting wctrl1−. The san pin associated with the losing request can also be asserted as san1−. In response to asserting wctrl1− and san1−, the ctrl and san pins associated with the wining request can also be asserted as wctrl2− and san2−. The assertion of wctrl1− and san1− prior to wctrl2− and san2− can indicate that the asynchronous circuit associated with the losing request (e.g., asynchronous circuit 104 in this case) is reset prior to resetting the asynchronous circuit associated with the wining request (e.g., asynchronous circuit 106 in this case). After both asynchronous circuits 104, 106 are reset, the issued grant g2 can be withdrawn by asserting g2− and STG 150 can return to a next cycle of arbitration by returning to start 152.

In one embodiment, at a node 158, if san2+ is asserted but g2+ is not asserted, STG 150 can transition to assert csc− and wctrl2− and san2− are asserted prior to wctrl1− and san1−. In another embodiment, at a node 160, in response to asserting san2−, STG 150 can assert g2− and can return to MUTEX circuit 102 to issue grant for the other request, which in this case is sig1+, g1+ can be asserted.

Figure 2A:
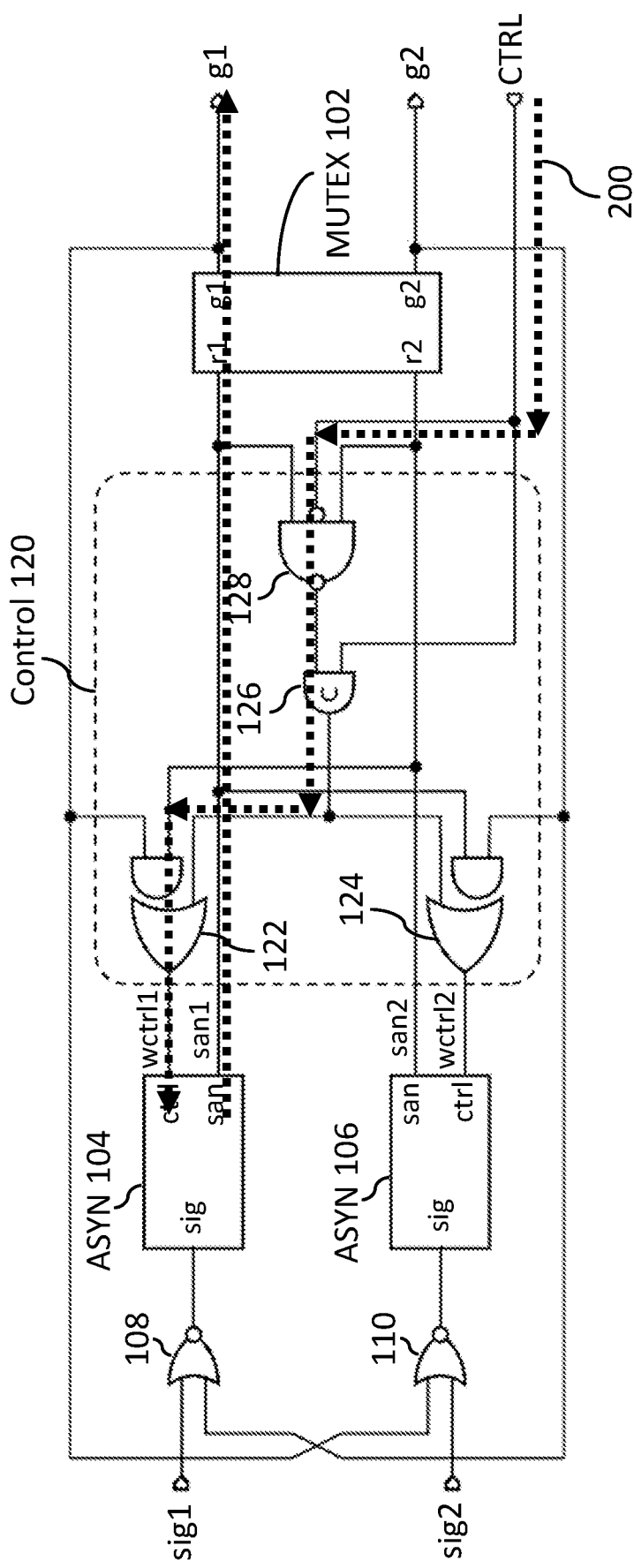
FIG. 2A is a diagram showing a critical signal path of an implementation of the circuit in FIG. 1A in one embodiment.

FIG. 2A is a diagram showing a critical signal path of an implementation of the circuit in FIG. 1A in one embodiment. In an example embodiment shown in FIG. 2A, a critical signal path 200 from CTRL+ to g1+, provided sig1 is high in advance, is shown. Critical signal path 200 can go through two-level logic gate 128, C-element 126, two-level logic gate 122, asynchronous circuit 104, then MUTEX circuit 102. A total gate delay of critical signal path 200 is five gate delays since it went through five gates. Since the critical signal paths in arbiter 100 are symmetric, a critical signal path from CTRL+ to g2+, provided sig2 is high in advance, would have the same gate delay as critical signal path 200.

Figure 2B:
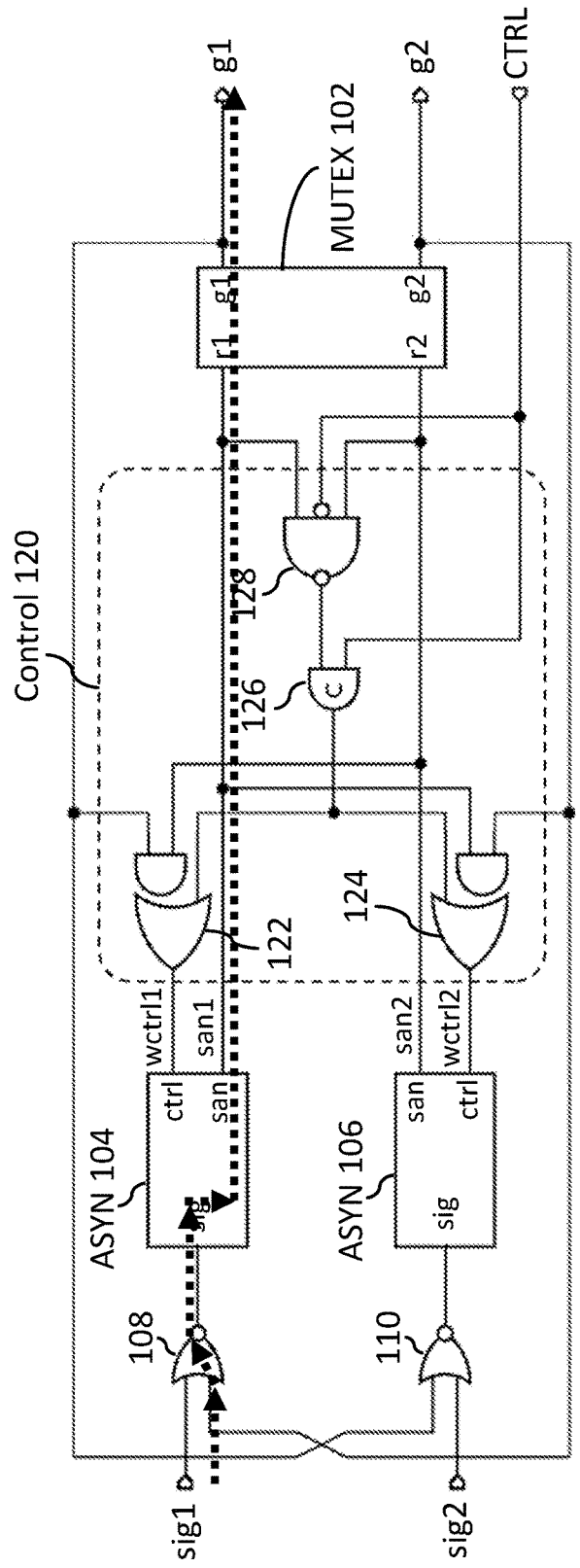
FIG. 2B is a diagram showing another critical signal path of an implementation of the circuit in FIG. 1A in one embodiment.

FIG. 2B is a diagram showing another critical signal path of an implementation of the circuit in FIG. 1A in one embodiment. In an example embodiment shown in FIG. 2B, a critical signal path 220 from sig1+ to g1+, provided CTRL is high in advance, is shown. Critical signal path 220 can go through NOR gate 108, asynchronous circuit 104, then MUTEX circuit 102. A total gate delay of critical signal path 220 is three gate delays since it went through three gates. Since the critical signal paths in arbiter 100 are symmetric, a critical signal path from sig2+ to g2+, provided CTRL is high in advance, would have the same gate delay as critical signal path 220.

Figure 3A:
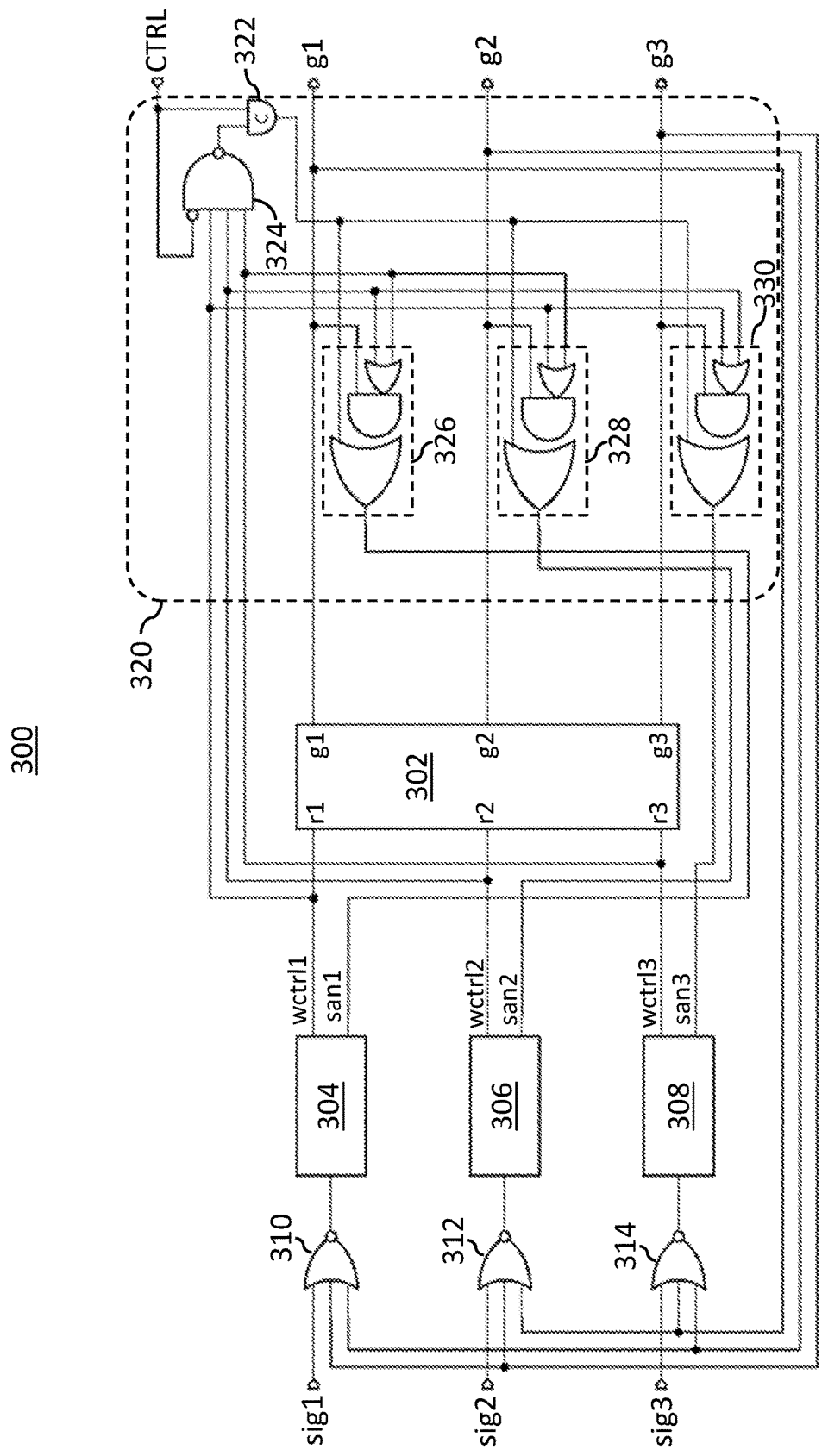
FIG. 3A is a diagram showing a circuit that can implement an arbiter for non-persistent signals representing three requests under a specific reset condition in one embodiment.

FIG. 3A is a diagram showing a circuit that can implement an arbiter for non-persistent signals representing three requests under a specific reset condition in one embodiment. In an aspect, arbiters can be expanded and scalable to arbitrate among multiple requests, such as more than two requests. Scalability of conventional arbiters may be limited because custom gates that may be unusual and not available in commonly used gate libraries may be required to expand to more than two requests. To address this shortcoming, the architecture of arbiter 100 shown in FIG. 1A can be expanded and scalable to more than two requests by using relatively small number of additional gates that are also commonly available gates.

In one embodiment, an example circuit 300, or arbiter 300, shown in FIG. 3A is expanded from arbiter 100 to arbitrate among three requests. Circuit 300 shown in FIG. 3A can be implemented by a semiconductor device. Arbiter 300 can include a MUTEX circuit 302, at least one asynchronous circuit, such as asynchronous circuits 304, 306, 308, NOR gates 310, 312, 314, and a control circuit 320. If a grant is issued to sig1, then arbiter 300 can rise grant signal g1 while keeping grant signals g2, g3 low. If a grant is issued to sig2, then arbiter 300 can rise grant signal g2 while keeping grant signals g1, g3 low. If a grant is issued to sig3, then arbiter 300 can rise grant signal g3 while keeping grant signals g1, g2 low.

MUTEX circuit 302 can operate similarly as, or can be a copy of, MUTEX circuit 102 shown in FIG. 1A. Asynchronous circuits 304, 306, 308 can operate similarly as, or can be copies of, asynchronous circuits 104, 106 shown in FIG. 1A. For example, asynchronous circuits 304, 306, 308 can be configured to sanitize signals sig1, sig2, sig3 for MUTEX circuit 302 such that MUTEX circuit 302 can arbitrate among sanitized signals san1, san2, san3 despite sig1, sig2, sig3 being non-persistent signals.

Asynchronous circuits 304, 306, 308 can receive control signals wcrtrl1, wcrtrl2 and wcrtrl3, respectively. If a rising transition occurs at the CTRL pin of arbiter 100, then control signals wctrl1, wctrl2 and wctrl3 can also have a rising transition and asynchronous circuits 304, 306, 308 can operate in waiting mode as described above with respect to asynchronous circuits 104, 106. If a falling transition occurs at the CTRL pin, then control signals wctrl1, wctrl2 and wctrl3 can also have a falling transition and asynchronous circuits 304, 306, 308 can operate in dormant mode as described above with respect to asynchronous circuits 104, 106. NOR gates 310, 312, 314 can be implemented between the sig1, sig2 and sig3 pins and asynchronous circuits 304, 306, 308 to allow all the asynchronous circuits associated with losing requests to latch before the end of the arbitration cycle, avoiding hazards.

Control circuit 320 can be a circuit that receives CTRL, san1, san2, san3, g1, g2 and g3 as inputs, and output control signals wctrl1, wctrl2 and wctrl3 to control asynchronous circuits 304, 306, 308 based on the received inputs. Control circuit 320 can include a C-element 322, a two-level logic gate 324, and three-level logic gates 326, 328, 330. The C-element 322 can be a binary logic circuit also known as the Muller C-element that can output a zero or low signal when of its inputs are zero or low, and outputs one or high when all of its inputs are one or high, and otherwise retains its output state. The C-element 322 can receive the CTRL signal and an output of two-level logic gate 324 as inputs and generate its output for three-level logic gates 326, 328, 330. The two-level logic gate 324 can be a NAND4 gate that takes four inputs that include an inverted value of CTRL, san1, san2 and san3. Thus, the output of two-level logic gate 324 can be dependent on CTRL, san1, san2 and san3. The three-level logic gates 326, 328, 330 can be 2-1-1 OR-AND-OR (OAO211) logic gates. The three-level logic gates 326, 328, 330 can be configured to generate the control signals wctrl1, wctrl2 and wctrl3, respectively.

In one embodiment, arbiter 300 in FIG. 3A can be configured for a concurrent reset with no sharing condition. The concurrent reset with no sharing condition is when 1) asynchronous circuits 304, 306, 308 associated with losing requests can be reset concurrently, and 2) the feedback of the g1, g2, g3 signals to force reset of asynchronous circuits associated with losing requests are not shared, thus NOR gates 310, 312, 314 can take three inputs. A STG of circuit 300 showing concurrent reset of asynchronous circuits 304, 306, 308 is shown in FIG. 3B.

Figure 3B:
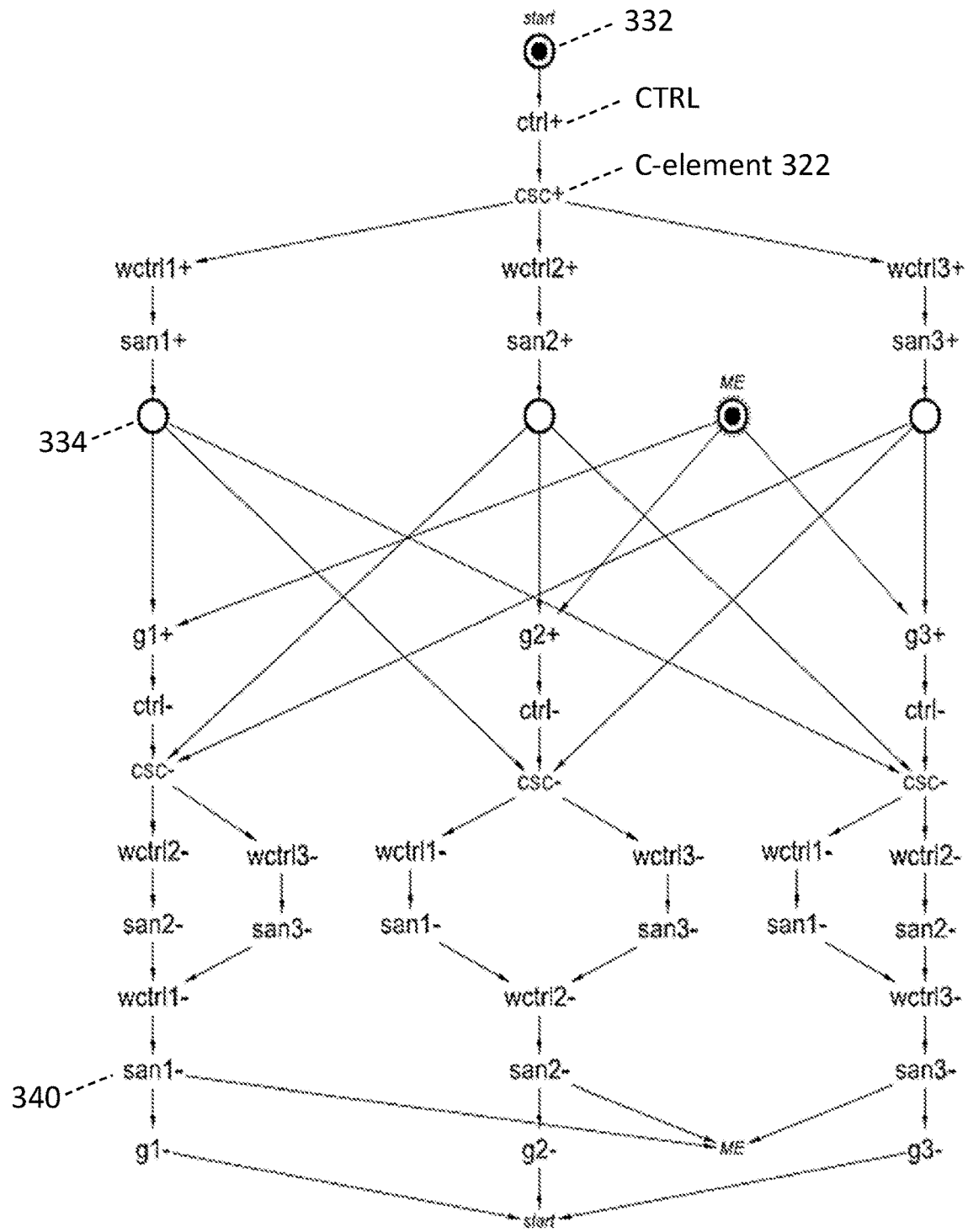
FIG. 3B is a diagram showing a signal transition graph of the circuit in FIG. 3A in one embodiment.

FIG. 3B is a diagram showing a signal transition graph of the circuit in FIG. 3A in one embodiment. Descriptions of FIG. 3B can reference components that were shown in FIG. 3A. A STG 331 is shown in FIG. 3B, and STG 331 depicts signal transitions of arbiter 300 shown in FIG. 3A. In STG 331 (and other STGs described herein), a plus sign "+" can indicate a rising transition from low to high and a minus sign "−" can indicate a falling transition from high to low.

At a start 332, a cycle of arbitration can begin by rising CTRL (asserting ctrl+). The C-element 322 can be initialized to high by rising an output csc of C-element 322 (asserting csc+). In response asserting ctrl+ and csc+, control signals wctrl1, wctrl2 and wctrl3 can rise by asserting wctrl1+, wctrl2+ and wctrl3+. In response to asserting wctrl1+, wctrl2+ and wctrl3+, asynchronous circuits 304, 306, 308 can operate in waiting mode and if their respective input signals sig are latched, asynchronous circuits 304, 306, 308 can rise their san pins by asserting san1+, san2+ and san3+, respectively. In response to asserting san1+, san2+ and san3+, MUTEX circuit 302 can issue a grant, by either asserting g1+, g2+ or g3+. Assertion of g1+ can indicate that the sig1 request is granted, assertion of g2+ can indicate that the sig2 request is granted and assertion of g3+ can indicate that the sig3 request is granted.

In response to asserting g1, CTRL can go low by asserting ctrl−. In response to asserting ctrl−, C-element 322 can also go low thus asserting csc−. In response to asserting ctrl− and csc−, the control signal associated with the losing requests, which are wctrl2 and wctrl3 in this case, can go low by asserting wctrl2− and wctrl3−. The san pin associated with the losing requests can also be asserted as san2− and san3−. The assertions of wctrl2− and wctrl3−, and the assertions of san2− and san3−, can be performed concurrently in arbiter 300 as shown in STG 331. In response to asserting wctrl2−, wctrl3−, san2− and san3−, the ctrl and san pins associated with the wining request can also be asserted as wctrl1− and san1−. The assertion of wctrl2−, wctrl3−, san2− and san3− prior to wctrl1− and san1− can indicate that the asynchronous circuit associated with the losing requests (e.g., asynchronous circuit 306, 308 in this case) are reset prior to resetting the asynchronous circuit associated with the wining request (e.g., asynchronous circuit 304 in this case). After asynchronous circuits 304, 306, 308 are reset, the issued grant g1 can be withdrawn by asserting g1− and STG 331 can return to a next cycle of arbitration by returning to start 332.

In one embodiment, at a node 334, if san1+ is asserted but g1+ is not asserted, STG 331 can transition to assert csc− and wctrl1− and san1− are asserted prior to wctrl2−, wctrl3−, san2− and san3−. In another embodiment, at a node 340, in response to asserting san1−, STG 332 can assert g1− and return to MUTEX circuit 302 to issue grant for the other requests, which in this case can be one of sig2 and sig3. Since signal paths in arbiter 300 are symmetric, the transition flows in situations where g2+ or g3+ is asserted will have the same transition flow as the case when g1+ is asserted.

Figure 3C:
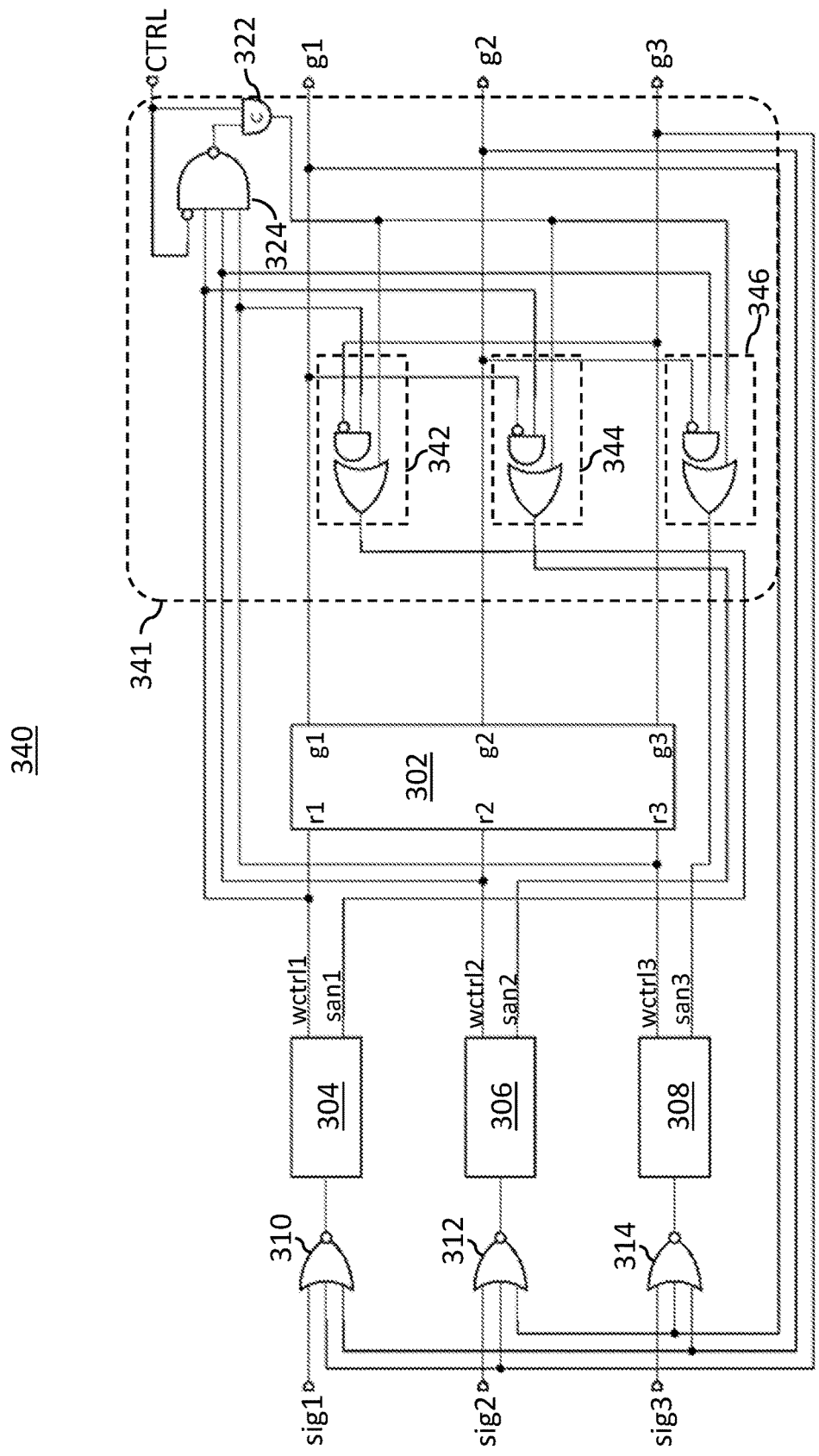
FIG. 3C is a diagram showing a circuit that can implement an arbiter for non-persistent signals representing three requests under another specific reset condition in one embodiment.

FIG. 3C is a diagram showing a circuit that can implement an arbiter for non-persistent signals representing three requests under another specific reset condition in one embodiment. Descriptions of FIG. 3C may reference components shown in FIG. 3A. In one embodiment, an example circuit 340, or arbiter 340, shown in FIG. 3C is expanded from arbiter 100 to arbitrate among three requests. Circuit 340 shown in FIG. 3C can be implemented by a semiconductor device. Arbiter 340 can include MUTEX circuit 302, asynchronous circuits 304, 306, 308, NOR gates 310, 312, 314, and a control circuit 341.

Control circuit 341 can be a circuit that receives CTRL, san1, san2, san3, g1, g2 and g3 as inputs, and output control signals wctrl1, wctrl2 and wctrl3 to control asynchronous circuits 304, 306, 308 based on the received inputs. Control circuit 341 can include C-element 322, two-level logic gate 324, and two-level logic gates 342, 344, 346. The C-element 322 can receive the CTRL signal and an output of two-level logic gate 324 as inputs and generate its output for two-level logic gates 342, 344, 346. The two-level logic gates 342, 344, 346 can be 2-1 AND-OR (AO21) logic gates. The two-level logic gates 342, 344, 346 can be configured to generate the control signals wctrl1, wctrl2 and wctrl3, respectively.

In one embodiment, arbiter 300 in FIG. 3A can be configured for a sequential reset with no sharing condition.

The sequential reset with no sharing condition is when 1) asynchronous circuits 304, 306, 308 can be reset sequentially, and 2) the feedback of the g1, g2, g3 signals to force reset of asynchronous circuits associated with losing requests are not shared, thus NOR gates 310, 312, 314 can take three inputs. A STG of circuit 340 showing sequential reset of asynchronous circuits 304, 306, 308 is shown in FIG. 3D.

Figure 3D:
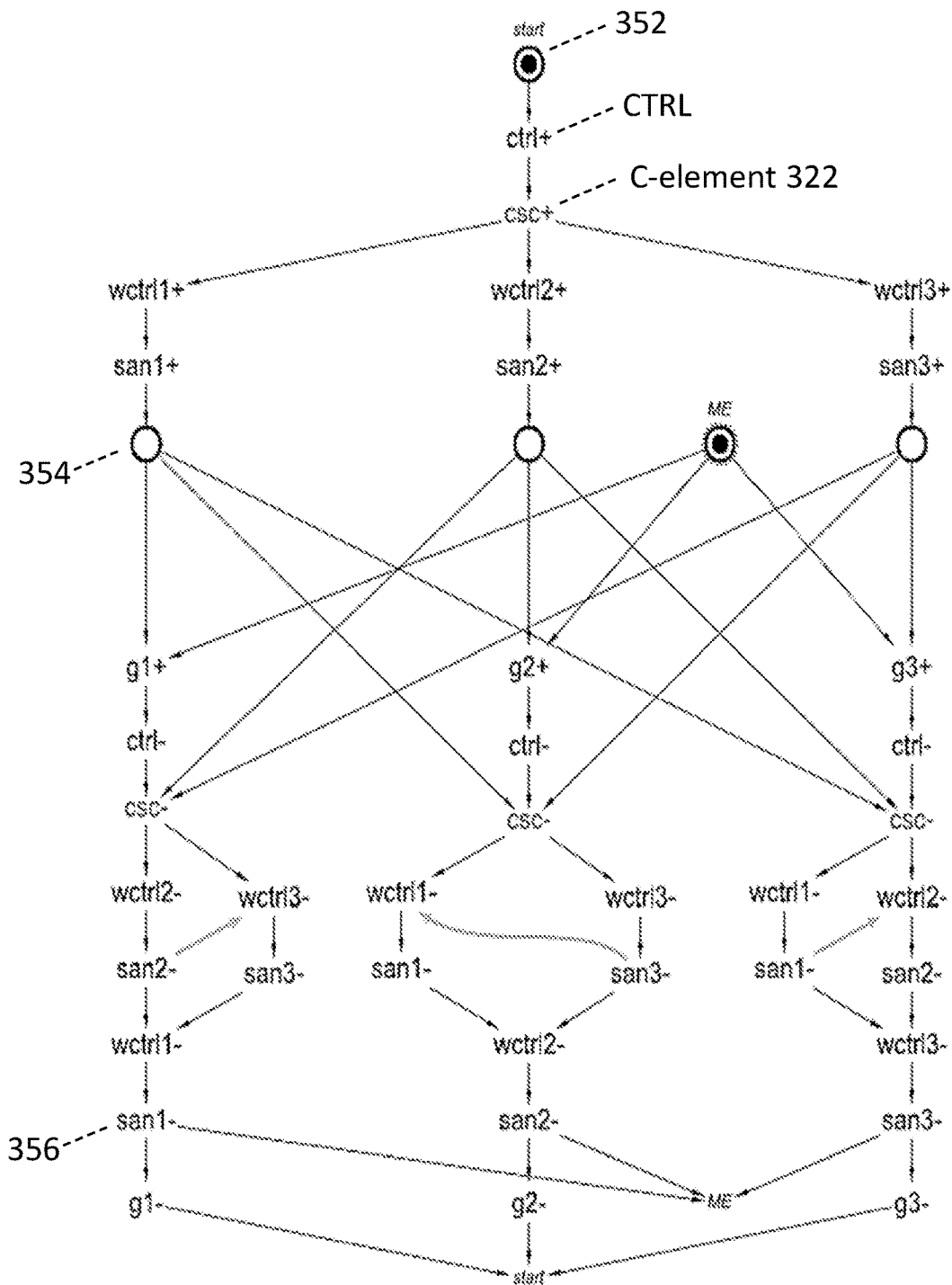
FIG. 3D is a diagram showing a state transition graph of signal transitions of the circuit in FIG. 3C in one embodiment.

FIG. 3D is a diagram showing a state transition graph of signal transitions of the circuit in FIG. 3C in one embodiment. Descriptions of FIG. 3D can reference components that were shown in FIG. 3C. A STG 350 is shown in FIG. 3D, and STG 350 depicts signal transitions of arbiter 340 shown in FIG. 3C. In STG 350 (and other STGs described herein), a plus sign "+" can indicate a rising transition from low to high and a minus sign "−" can indicate a falling transition from high to low.

At a start 352, a cycle of arbitration can begin by rising CTRL (asserting ctrl+). The C-element 322 can be initialized to high by rising an output csc of C-element 322 (asserting csc+). In response asserting ctrl+ and csc+, control signals wctrl1, wctrl2 and wctrl3 can rise by asserting wctrl1+, wctrl2+ and wctrl3+. In response to asserting wctrl1+, wctrl2+ and wctrl3+, asynchronous circuits 304, 306, 308 can operate in waiting mode and if their respective input signals sig are latched, asynchronous circuits 304, 306, 308 can rise their san pins by asserting san1+, san2+ and san3+, respectively. In response to asserting san1+, san2+ and san3+, MUTEX circuit 302 can issue a grant, by either asserting g1+, g2+ or g3+. Assertion of g1+ can indicate that the sig1 request is granted, assertion of g2+ can indicate that the sig2 request is granted and assertion of g3+ can indicate that the sig3 request is granted.

In response to asserting g1, CTRL can go low by asserting ctrl−. In response to asserting ctrl−, C-element 322 can also go low thus asserting csc−. In response to asserting ctrl− and csc−, one of the control signal associated with the losing requests, which can be one of wctrl2 and wctrl3 in this case, can go low by asserting wctrl2− or wctrl3−. In STG 350, in response to asserting ctrl− and csc−, wctrl2− is asserted. In response to asserting wctrl2−, san2− is asserted. In response to san2− being asserted, wctrl3− is asserted, followed by assertion of san3−. The order to assert wctrl2−, then san2−, then wctrl3−, and finally san3−, is a sequential reset performed by arbiter 340 shown in FIG. 3C. After the sequential reset, the ctrl and san pins associated with the wining request can also be asserted as wctrl1− and san1−. The assertion of wctrl2−, wctrl3−, san2− and san3− prior to wctrl1− and san1− can indicate that the asynchronous circuit associated with the losing requests (e.g., asynchronous circuit 306, 308 in this case) are reset prior to resetting the asynchronous circuit associated with the wining request (e.g., asynchronous circuit 304 in this case). After asynchronous circuits 304, 306, 308 are reset, the issued grant g1 can be withdrawn by asserting g1− and STG 331 can return to a next cycle of arbitration by returning to start 332.

In one embodiment, at a node 354, if san1+ is asserted but g1+ is not asserted, STG 350 can transition to assert csc− and wctrl1− and san1− are asserted prior to wctrl2−, wctrl3−, san2− and san3−. In another embodiment, at a node 356, in response to asserting san1−, STG 350 can assert g1− and return to MUTEX circuit 302 to issue grant for the other requests, which in this case can be one of sig2 and sig3. Since signal paths in arbiter 340 are symmetric, the transition flows in situations where g2+ or g3+ is asserted will have the same transition flow as the case when g1+ is asserted.

Figure 4A:
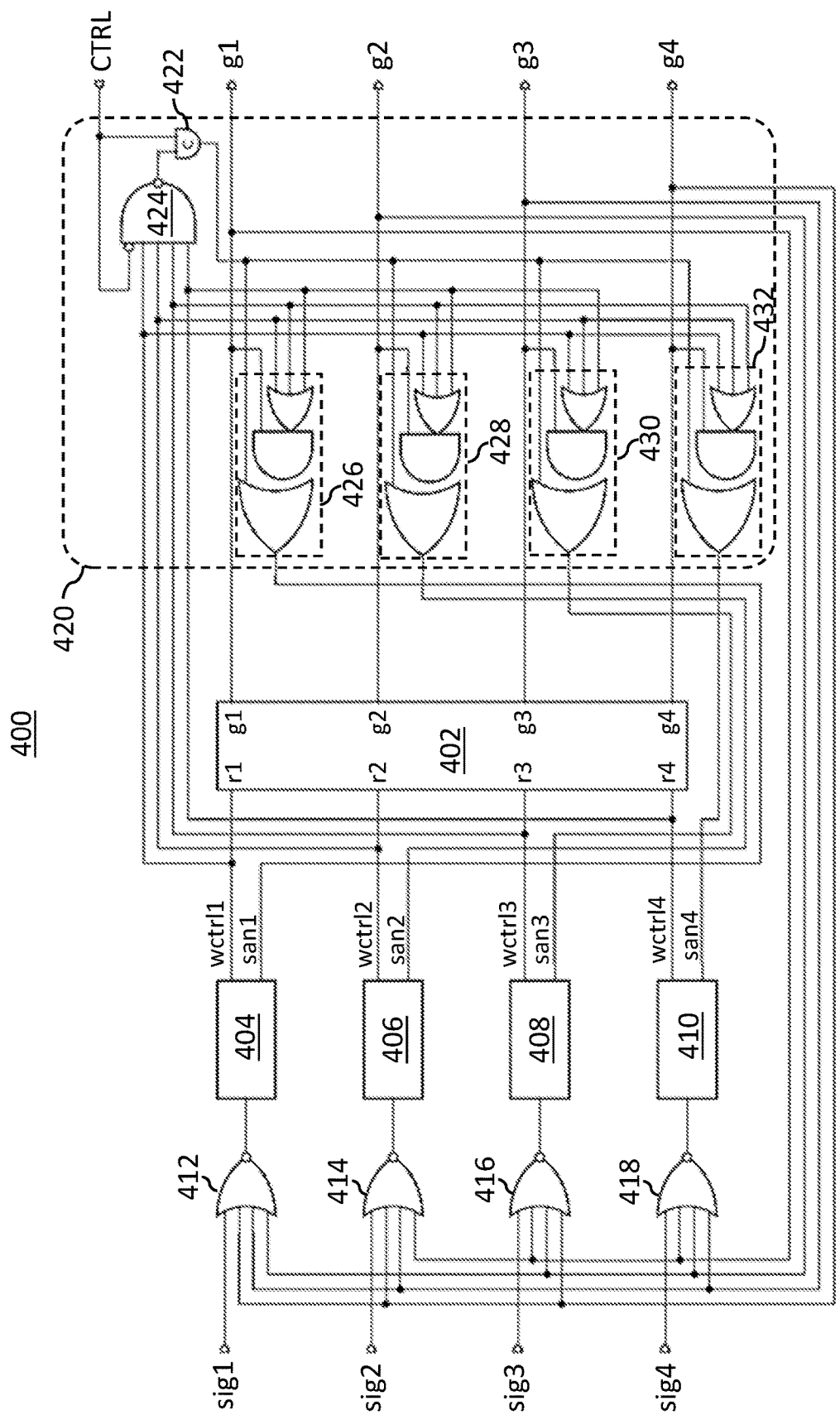
FIG. 4A is a diagram showing a circuit that can implement an arbiter for non-persistent signals representing four requests under a specific reset condition in one embodiment.

FIG. 4A is a diagram showing a circuit that can implement an arbiter for non-persistent signals representing four requests under a specific reset condition in one embodiment. In one embodiment, an example circuit 400, or arbiter 400, shown in FIG. 4A is expanded from arbiter 100 to arbitrate among four requests. Circuit 400 shown in FIG. 4A can be implemented by a semiconductor device. Arbiter 400 can include a MUTEX circuit 402, at least one asynchronous circuit, such as asynchronous circuits 404, 406, 408, 410, NOR gates 412, 414, 416, 418, and a control circuit 420. If a grant is issued to sig1, then arbiter 400 can rise grant signal g1 while keeping grant signals g2, g3, g4 low. If a grant is issued to sig2, then arbiter 400 can rise grant signal g2 while keeping grant signals g1, g3, g4 low. If a grant is issued to sig3, then arbiter 400 can rise grant signal g3 while keeping grant signals g1, g2, g4 low. If a grant is issued to sig4, then arbiter 400 can rise grant signal g4 while keeping grant signals g1, g2, g3 low.

MUTEX circuit 402 can operate similarly as, or can be a copy of, MUTEX circuit 102 shown in FIG. 1A. Asynchronous circuits 404, 406, 408, 410 can operate similarly as, or can be copies of, asynchronous circuits 104, 106 shown in FIG. 1A. For example, asynchronous circuits 404, 406, 408, 410 can be configured to sanitize signals sig1, sig2, sig3, sig4 for MUTEX circuit 402 such that MUTEX circuit 402 can arbitrate among sanitized signals san1, san2, san3, san4 despite sig1, sig2, sig3, sig4 being non-persistent signals.

Asynchronous circuits 404, 406, 408, 410 can receive control signals wcrtrl1, wcrtrl2, wcrtrl3 and wcrtrl4, respectively. If a rising transition occurs at the CTRL pin of arbiter 100, then control signals wctrl1, wctrl2, wcrtrl3 and wcrtrl4 can also have a rising transition and asynchronous circuits 404, 406, 408, 410 can operate in waiting mode as described above with respect to asynchronous circuits 104, 106. If a falling transition occurs at the CTRL pin, then control signals wctrl1, wctrl2, wcrtrl3 and wcrtrl4 can also have a falling transition and asynchronous circuits 404, 406, 408, 410 can operate in dormant mode as described above with respect to asynchronous circuits 104, 106. NOR gates 404, 406, 408, 410 can be implemented between the sig1, sig2, sig3 and sig4 pins and asynchronous circuits 404, 406, 408, 410 to allow all the asynchronous circuits associated with losing requests to latch before the end of the arbitration cycle, avoiding hazards.

Control circuit 420 can be a circuit that receives CTRL, san1, san2, san3, san4, g1, g2, g3 and g4 as inputs, and output control signals wctrl1, wctrl2, wcrtrl3 and wcrtrl4, to control asynchronous circuits 404, 406, 408, 410 based on the received inputs. Control circuit 420 can include a C-element 422, a two-level logic gate 424, and three-level logic gates 426, 428, 430, 432. The C-element 422 can be a binary logic circuit also known as the Muller C-element that can output a zero or low signal when of its inputs are zero or low, and outputs one or high when all of its inputs are one or high, and otherwise retains its output state. The C-element 422 can receive the CTRL signal and an output of two-level logic gate 424 as inputs and generate its output for three-level logic gates 426, 428, 430, 432. The two-level logic gate 424 can be a NAND5 gate that takes five inputs that include an inverted value of CTRL, san1, san2, san3 and san4. Thus, the output of two-level logic gate 424 can be dependent on CTRL, san1, san2, san3 and san4. The three-level logic gates 426, 428, 430, 432 can be 3-1-1 OR-AND-OR (OAO311) logic gates. The three-level logic gates 426, 428, 430, 432 can be configured to generate the control signals wctrl1, wctrl2, wcrtrl3 and wcrtrl4, respectively.

In one embodiment, arbiter 400 in FIG. 4A can be configured for a concurrent reset with no sharing condition. The concurrent reset with no sharing condition is when 1) asynchronous circuits 404, 406, 408, 410 associated with the losing requests can be reset concurrently, and 2) the feedback of the g1, g2, g3, g4 signals to force reset of asynchronous circuits associated with losing requests are not shared, thus NOR gates 412, 414, 416, 418 can take four inputs. A STG of circuit 400 showing concurrent reset of asynchronous circuits 404, 406, 408, 410 is shown in FIG. 4B.

Figure 4B:
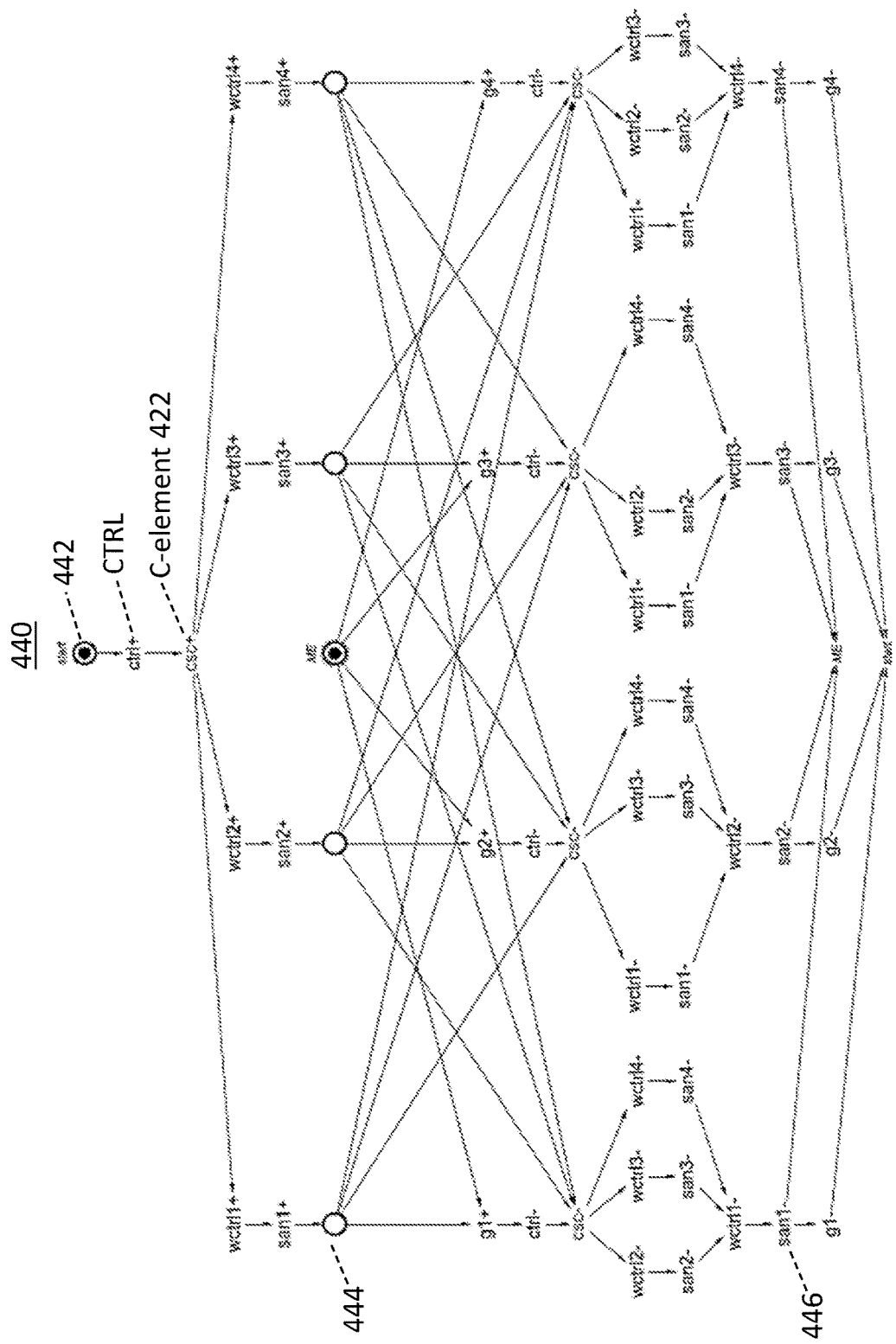
FIG. 4B is a diagram showing a signal transition graph of the circuit in FIG. 4A in one embodiment.

FIG. 4B is a diagram showing a state transition graph of signal transitions of the circuit in FIG. 4A in one embodiment. Descriptions of FIG. 4B can reference components that were shown in FIG. 4A. A STG 440 is shown in FIG. 4B, and STG 440 depicts signal transitions of arbiter 400 shown in FIG. 4A. In STG 440 (and other STGs described herein), a plus sign "+" can indicate a rising transition from low to high and a minus sign "−" can indicate a falling transition from high to low.

At a start 442, a cycle of arbitration can begin by rising CTRL (asserting ctrl+). The C-element 422 can be initialized to high by rising an output csc of C-element 422 (asserting csc+). In response asserting ctrl+ and csc+, control signals wctrl1, wctrl2, wctrl3 and wctrl4 can rise by asserting wctrl1+, wctrl2+, wctrl3+ and wctrl4+. In response to asserting wctrl2+, wctrl3+ and wctrl4+, asynchronous circuits 404, 406, 408, 410 can operate in waiting mode and if their respective input signals sig are latched, asynchronous circuits 404, 406, 408, 410 can rise their san pins by asserting san1+, san2+, san3+ and san4+, respectively. In response to asserting san1+, san2+, san3+ and san4+, MUTEX circuit 402 can issue a grant, by either asserting g1+, g2+, g3+ or g4+. Assertion of g1+ can indicate that the sig1 request is granted, assertion of g2+ can indicate that the sig2 request is granted, assertion of g3+ can indicate that the sig3 request is granted and assertion of g4+ can indicate that the sig4 request is granted.

In response to asserting g1, CTRL can go low by asserting ctrl−. In response to asserting ctrl+, C-element 422 can also go low thus asserting csc−. In response to asserting ctrl− and csc−, the control signal associated with the losing requests, which are wctrl2, wctrl3 and wctrl4 in this case, can go low by asserting wctrl2−, wctrl3− and wctrl4−. The san pin associated with the losing requests can also be asserted as san2−, san3− and san4−. The assertions of wctrl2−, wctrl3− and wctrl4−, and the assertions of san2−, san3− and san4−, can be performed concurrently in arbiter 400 as shown in STG 440. In response to asserting wctrl2−, wctrl3−, wctrl4−, san2−, san3− and san4−, the ctrl and san pins associated with the wining request can also be asserted as wctrl1− and san1−. The assertion of wctrl2−, wctrl3−, wctrl4−, san2−, san3− and san4− prior to wctrl1− and san1− can indicate that the asynchronous circuit associated with the losing requests (e.g., asynchronous circuit 406, 408, 410 in this case) are reset prior to resetting the asynchronous circuit associated with the wining request (e.g., asynchronous circuit 404 in this case). After asynchronous circuits 404, 406, 408, 410 are reset, the issued grant g1 can be withdrawn by asserting g1− and STG 440 can return to a next cycle of arbitration by returning to start 442.

In one embodiment, at a node 444, if san1+ is asserted but g1+ is not asserted, STG 440 can transition to assert csc− and wctrl1− and san1− are asserted prior to wctrl2−, wctrl3−, wctrl4−, san2−, san3− and san4−. In another embodiment, at a node 446, in response to asserting san1−, STG 440 can assert g1− and return to MUTEX circuit 402 to issue grant for the other requests, which in this case can be one of sig2, sig3 and sig4. Since signal paths in arbiter 400 are symmetric, the transition flows in situations where g2+, g3+ or g4+ is asserted will have the same transition flow as the case when g1+ is asserted.

Figure 4C:
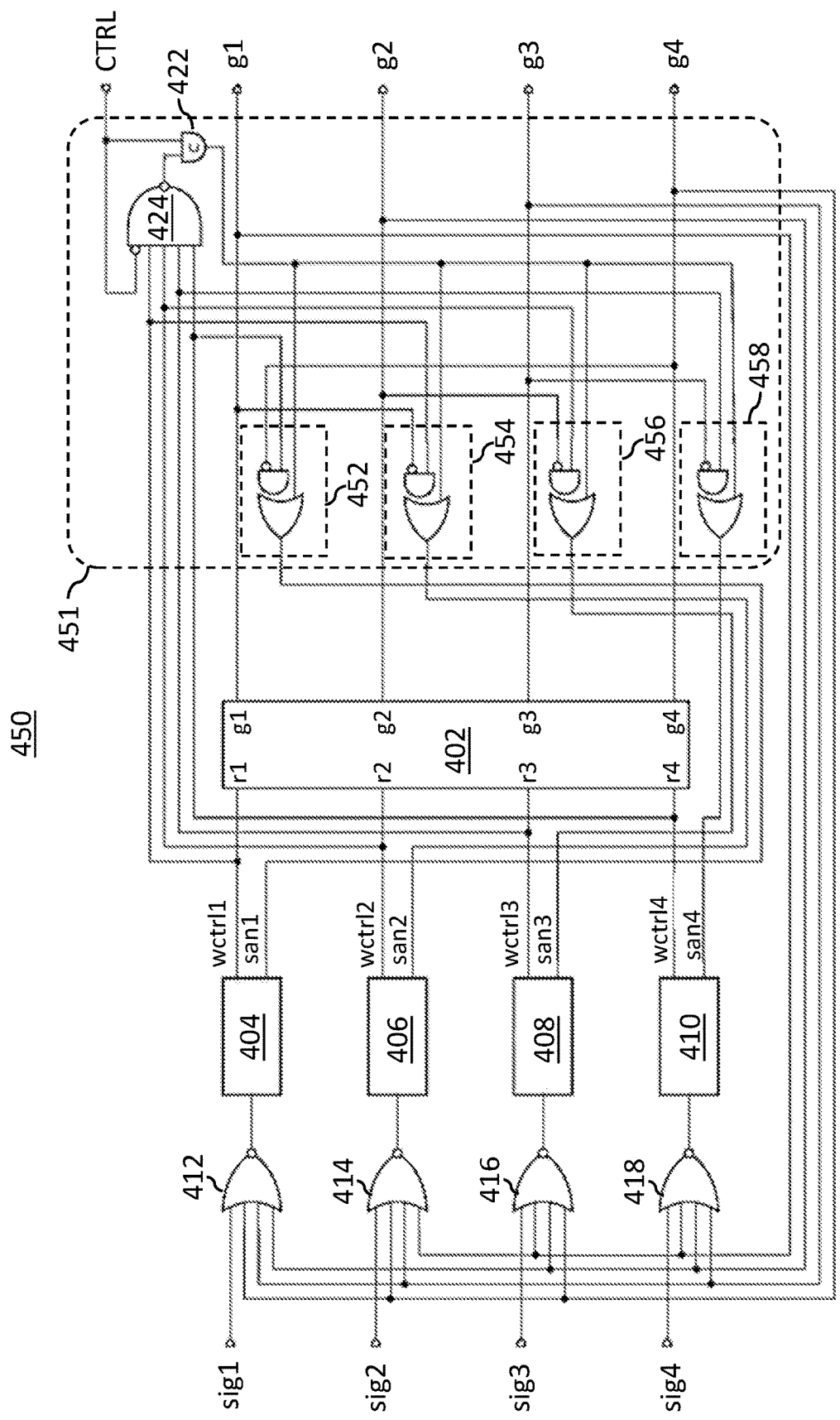
FIG. 4C is a diagram showing a circuit that can implement an arbiter for non-persistent signals representing four requests under another specific reset condition in one embodiment.

FIG. 4C is a diagram showing a circuit that can implement an arbiter for non-persistent signals representing four requests under another specific reset condition in one embodiment. Descriptions of FIG. 4C may reference components shown in FIG. 4A. In one embodiment, an example circuit 450, or arbiter 450, shown in FIG. 4C is expanded from arbiter 100 to arbitrate among four requests. Circuit 450 shown in FIG. 4C can be implemented by a semiconductor device. Arbiter 400 can include a MUTEX circuit 402, at least one asynchronous circuit, such as asynchronous circuits 404, 406, 408, 410, NOR gates 412, 414, 416, 418, and a control circuit 451.

Control circuit 451 can be a circuit that receives CTRL, san1, san2, san3, san4, g1, g2, g3 and g4 as inputs, and output control signals wctrl1, wctrl2, wcrtrl3 and wcrtrl4, to control asynchronous circuits 404, 406, 408, 410 based on the received inputs. Control circuit 451 can include C-element 422, two-level logic gate 424, and two-level logic gates 452, 454, 456, 458. C-element 422 can receive the CTRL signal and an output of two-level logic gate 424 as inputs and generate its output for two-level logic gates 452, 454, 456, 458. The two-level logic gate 424 can be a NAND5 gate that takes five inputs that include an inverted value of CTRL, san1, san2, san3 and san4. Thus, the output of two-level logic gate 424 can be dependent on CTRL, san1, san2, san3 and san4. The two-level logic gates 452, 454, 456, 458 can be 2-1 AND-OR (AO21) logic gates. The two-level logic gates 452, 454, 456, 458 can be configured to generate the control signals wctrl1, wctrl2, wcrtrl3 and wcrtrl4, respectively.

In one embodiment, arbiter 450 in FIG. 4C can be configured for a sequential reset with no sharing condition. The sequential reset with no sharing condition is when 1) asynchronous circuits 404, 406, 408, 410 can be reset sequentially, and 2) the feedback of the g1, g2, g3, g4 signals to force reset of asynchronous circuits associated with losing requests are not shared, thus NOR gates 412, 414, 416, 418 can take four inputs. A STG of circuit 450 showing sequential reset of asynchronous circuits 404, 406, 408, 410 is shown in FIG. 4D.

Figure 4D:
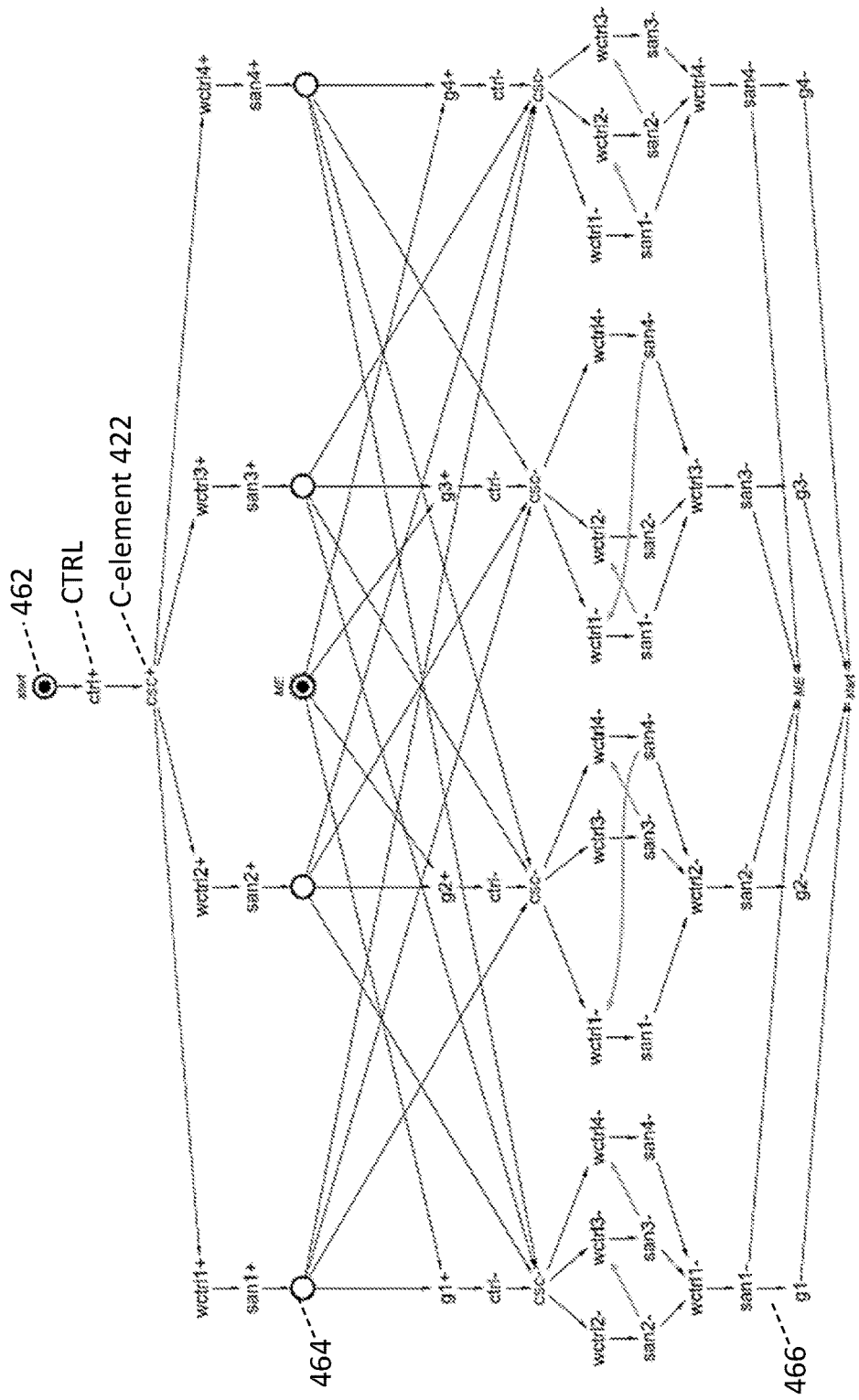
FIG. 4D is a diagram showing a signal transition graph of the circuit in FIG. 4C in one embodiment.

FIG. 4D is a diagram showing a state transition graph of signal transitions of the circuit in FIG. 4C in one embodiment. Descriptions of FIG. 4D can reference components that were shown in FIG. 4C. A STG 460 is shown in FIG. 4B, and STG 460 depicts signal transitions of arbiter 450 shown in FIG. 4C. In STG 460 (and other STGs described herein), a plus sign "+" can indicate a rising transition from low to high and a minus sign "−" can indicate a falling transition from high to low.

At a start 462, a cycle of arbitration can begin by rising CTRL (asserting ctrl+). The C-element 422 can be initialized to high by rising an output csc of C-element 422 (asserting csc+). In response asserting ctrl+ and csc+, control signals wctrl1, wctrl2, wctrl3 and wctrl4 can rise by asserting wctrl1+, wctrl2+, wctrl3+ and wctrl4+. In response to asserting wctrl2+, wctrl3+ and wctrl4+, asynchronous circuits 404, 406, 408, 410 can operate in waiting mode and if their respective input signals sig are latched, asynchronous circuits 404, 406, 408, 410 can rise their san pins by asserting san1+, san2+, san3+ and san4+, respectively. In response to asserting san1+, san2+, san3+ and san4+, MUTEX circuit 402 can issue a grant, by either asserting g1+, g2+, g3+ or g4+. Assertion of g1+ can indicate that the sig1 request is granted, assertion of g2+ can indicate that the sig2 request is granted, assertion of g3+ can indicate that the sig3 request is granted and assertion of g4+ can indicate that the sig4 request is granted.

In response to asserting g1. CTRL can go low by asserting ctrl–. In response to asserting ctrl–, C-element 422 can also go low thus asserting csc–. In response to asserting ctrl– and csc–, the control signal associated with the losing requests, which are wctrl2, wctrl3 and wctrl4 in this case, can go low by asserting wctrl2–, wctrl3– and wctrl4–. In STG 460, in response to asserting ctrl– and csc–, wctrl2– is asserted. In response to asserting wctrl2–, san2– is asserted. In response to san2– being asserted, wctrl3– is asserted, followed by assertion of san3–. In response to san3– being asserted, wctrl4– is asserted, followed by assertion of san4–. The order to assert wctrl2–, san2–, then wctrl3–, then san3–, then wctrl4–, then finally san4–, is a sequential reset performed by arbiter 450 shown in FIG. 4C. After the sequential reset, the ctrl and san pins associated with the wining request can also be asserted as wctrl1– and san1–. The assertion of wctrl2–, wctrl3–, wctrl4–, san2–, san3– and san4– prior to wctrl1– and san1– can indicate that the asynchronous circuit associated with the losing requests (e.g., asynchronous circuit 406, 408, 410 in this case) are reset prior to resetting the asynchronous circuit associated with the wining request (e.g., asynchronous circuit 404 in this case). After asynchronous circuits 404, 406, 408, 410 are reset, the issued grant g1 can be withdrawn by asserting g1– and STG 440 can return to a next cycle of arbitration by returning to start 442.

In one embodiment, at a node 464, if san1+ is asserted but g1+ is not asserted, STG 460 can transition to assert csc– and wctrl1– and san1– are asserted prior to wctrl2–, wctrl3–, wctrl4–, san2–, san3– and san4–. In another embodiment, at a node 466, in response to asserting san1–, STG 460 can assert g1– and return to MUTEX circuit 402 to issue grant for the other requests, which in this case can be one of sig2, sig3 and sig4. Since signal paths in arbiter 400 are symmetric, the transition flows in situations where g2+, g3+ or g4+ is asserted will have the same transition flow as the case when g1+ is asserted.

Figure 4E:
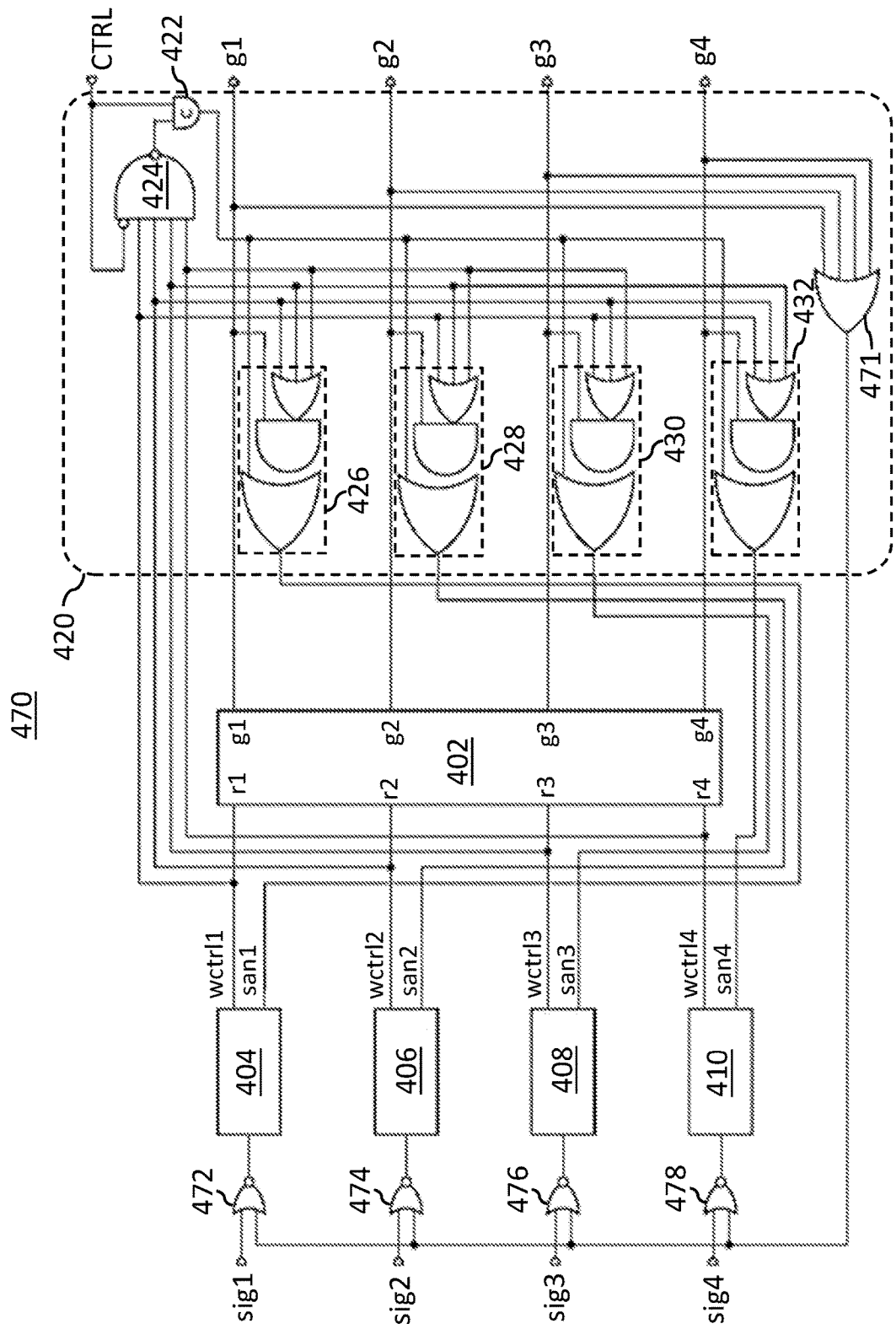
FIG. 4E is a diagram showing a circuit that can implement an arbiter for non-persistent signals representing four requests under another specific reset condition in one embodiment.

FIG. 4E is a diagram showing a circuit that can implement an arbiter for non-persistent signals representing four requests under another specific reset condition in one embodiment. An arbiter 470 shown in FIG. 4E can be a variation of arbiter 400 shown in FIG. 4A. Arbiter 470 can include NOR gates 472, 474, 476, 478 and an OR gate 471. The OR gate 471 can receive grant signals g1, g2, g3, g4 as inputs. Thus, as long as arbiter 470 issues a grant, an output of OR gate 471 can be logic high. The output of OR gate 471 can be fed into each one of NOR gates 472, 474, 476, 478, such that as long as there is one grant issued, one or more of asynchronous circuits 404, 406, 408, 410 that did not latch its sig input will be reset.

In one embodiment, an arbiter 470 in FIG. 4E can be configured for a concurrent reset with sharing condition. The concurrent reset with sharing condition is when 1) asynchronous circuits 404, 406, 408, 410 associated with losing requests can be reset concurrently, and 2) the feedback of the g1, g2, g3, g4 signals to force reset of asynchronous circuits associated with losing requests are shared, where the sharing can be implemented by OR gate 471.

Figure 4F:
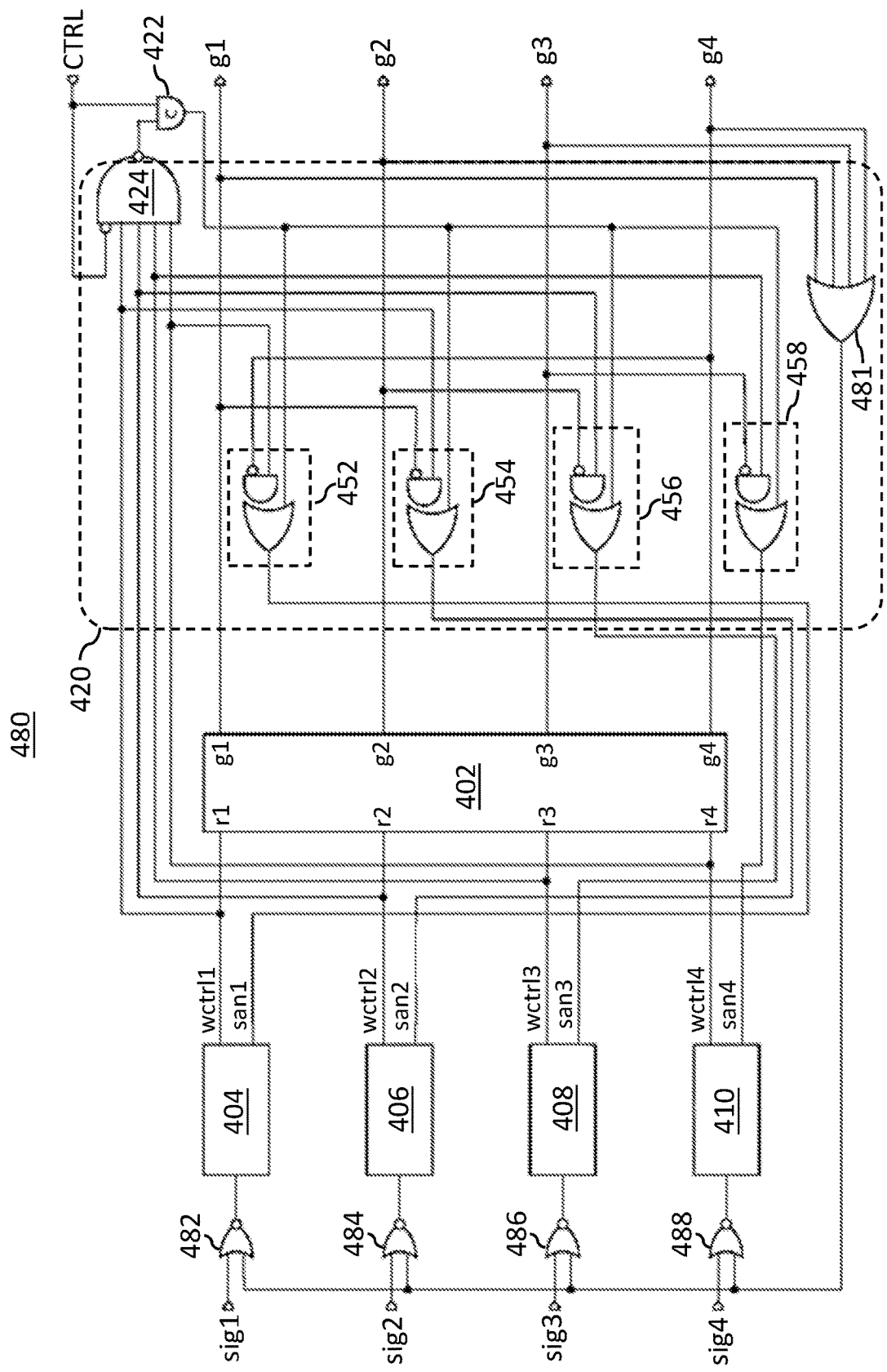
FIG. 4F is a diagram showing a circuit that can implement an arbiter for non-persistent signals representing four requests under another specific reset condition in one embodiment.

FIG. 4F is a diagram showing a circuit that can implement an arbiter for non-persistent signals representing four requests under another specific reset condition in one embodiment. An arbiter 480 shown in FIG. 4F can be a variation of arbiter 450 shown in FIG. 4C. Arbiter 480 can include NOR gates 482, 484, 486, 488 and an OR gate 481. The OR gate 481 can receive grant signals g1, g2, g3, g4 as inputs. Thus, as long as arbiter 480 issues a grant, an output of OR gate 481 can be logic high. The output of OR gate 481 can be fed into each one of NOR gates 482, 484, 486, 488, such that as long as there is one grant issued, one or more of asynchronous circuits 404, 406, 408, 410 that did not latch its sig input will be reset.

In one embodiment, an arbiter 480 in FIG. 4F can be configured for a sequential reset with sharing condition. The concurrent reset with sharing condition is when 1) asynchronous circuits 404, 406, 408, 410 can be reset sequentially, and 2) the feedback of the g1, g2, g3, g4 signals to force reset of asynchronous circuits associated with losing requests are shared, where the sharing can be implemented by OR gate 481.

FIG. 5 is a diagram showing a system that can implement an arbiter for non-persistent signals in one embodiment. A system 500 shown in FIG. 5 can be an example system or application that can utilize an arbiter 510 configured to arbitrate non-persistent signals. Arbiter 510 can be, for example, any one of arbiters 100, 300, 340, 400, 450, 470, 480 described above. Arbiter 510 can be configured to receive N requests for a resource 504, where the N requests can be represented by N non-persistent signals denoted as sig1, . . . , sigN, where N can be greater than or equal to two. A plurality of clients 502-1, . . . 502-N, or N client devices, can send the N non-persistent signals sig1, . . . , sigN to arbiter 510. Arbiter 510 can arbitrate among the N non-persistent signals sig1, . . . , sigN and issue at most one grant at a time as one of grant signals g1, . . . gN. In another embodiment, system 500 can be implemented in various asynchronous circuits, power management integrated circuits (ICs), asynchronous controllers, AC-DC converters, near field communication (NFC) rectifiers, single inductor multiple output converter, or other types of asynchronous systems that utilizes an arbiter to arbitrate request signals.

By way of example, a single inductor multiple output (SIMO) DC-DC converter, the multiple outputs can be charged using only one inductor due to cost saving. Each output has an associated monitor to check if its voltage level is within the specification or needs to be charged. The various output monitors can be the clients and the inductor can be the shared resource, such that the arbiters described herein can arbitrate among the output monitors to access the inductor. In another example for voltage converters, the arbiters described herein can also be used for interpreting which request arrives first such that different actions can be performed depending on the order of arrival. For example, when a high-side metal-oxide-semiconductor field-effect transistor (MOSFET) is turned on, a pulse width modulation (PWM) comparator and an over-current comparator (e.g., for over current protection purposes) can be monitored. If the PWM comparator arrives first, then operation can remain normal. If the over current comparator arrives first, then there may been an issue that needs to be managed.

Using arbiters 300, 340, 400, 450, 470, 480 described above as examples, arbiter 510 can include N asynchronous circuits for sanitizing the N non-persistent signals to generate N persistent signals, N NOR gates for resetting asynchronous circuits associated with losing requests to latch before the end of the arbitration cycle, and a mutual exclusive (MUTEX) circuit (e.g., MUTEX 102, 302, 402) can arbitrate among the N persistent signals. Arbiter 510 can further include a control circuit that includes 1) a NAND gate configured to receive an inverse of the control signal (CTRL shown in FIGS. 1A to 4F) and the N persistent signals as inputs, 2) a C-element configured to receive the control signal CTRL and an output of the NAND gate as inputs, and 3) N multi-level logic gates (e.g., two-level or 3-level, depending on concurrent or sequential reset as described in FIGS. 3A to 4F) configured to output N operation mode control signals to control the N asynchronous circuits to operate in waiting mode or dormant mode. Further, regardless of the value of N, a gate delay incurred by the control circuit of arbiter 510 (and the other arbiters described herein) is at most three gate delays.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
   a first asynchronous circuit configured to:
      receive a first non-persistent signal representing a first request; and
      sanitize the first non-persistent signal to generate a first persistent signal;
   a second asynchronous circuit configured to:
      receive a second non-persistent signal representing a second request; and
      sanitize the second non-persistent signal to generate a second persistent signal;
   a mutual exclusive (MUTEX) circuit configured to:
      arbitrate between the first persistent signal and the second persistent signal; and
      output a grant signal to issue a grant to one of the first request and the second request; and
   a control circuit configured to control an operation mode of the first asynchronous circuit and the second asynchronous circuit based on a control signal, a first grant signal indicating a grant status of the first request, a second grant signal indicating a grant status of the second request, the first persistent signal and the second persistent signal, wherein the control circuit comprises:
      a NAND gate configured to receive an inverse of the control signal, the first persistent signal and the second persistent signal as inputs;
      a C-element configured to receive the control signal and an output of the NAND gate as inputs;
      a first two-level logic gate configured to:
         receive the second persistent signal, the first grant signal and an output of the C-element as inputs; and
         output a first operation mode control signal to control the first asynchronous circuit; and
      a second two-level logic gate configured to:
         receive the first persistent signal, the second grant signal and the output of the C-element as inputs; and
         output a second operation mode control signal to control the second asynchronous circuit.

2. The semiconductor device of claim 1, wherein:
   to sanitize the first non-persistent signal, the first asynchronous circuit is configured to:
      in response to the first non-persistent signal being above a predefined threshold voltage for a predetermined amount of time, rise the first persistent signal to logic high; and
      in response to the second non-persistent signal being above the predefined threshold voltage for the predetermined amount of time, rise the second persistent signal to logic high.

3. The semiconductor device of claim 1, wherein a gate delay provided by the control circuit is at most three gate delays.

4. The semiconductor device of claim 1, wherein:
   in response to a rising transition of the first operation mode control signal, the first asynchronous circuit operates in a waiting mode;
   in response to a falling transition of the first operation mode control signal, the first asynchronous circuit operates in a dormant mode;
   in response to a rising transition of the second operation mode control signal, the second asynchronous circuit operates in the waiting mode; and
   in response to a falling transition of the second operation mode control signal, the second asynchronous circuit operates in the dormant mode.

5. The semiconductor device of claim 1, further comprising:
   a first NOR gate configured to:
      receive the first non-persistent signal and the second grant signal as inputs; and
      in response to the first non-persistent signal failing to be above a predefined threshold voltage for a predetermined amount of time, reset the first asynchronous circuit; and
   a second NOR gate configured to:
      receive the second non-persistent signal and the first grant signal as inputs; and
      in response to the second non-persistent signal failing to be above the predefined threshold voltage for the predetermined amount of time, reset the second asynchronous circuit.

6. A system comprising:
   a first client;
   a second client;
   a resource; and
   an arbiter comprising:
      a first asynchronous circuit configured to:
         receive a first non-persistent signal representing a first request from the first client; and
         sanitize the first non-persistent signal to generate a first persistent signal;
      a second asynchronous circuit configured to:

receive a second non-persistent signal representing a second request from the second client; and sanitize the second non-persistent signal to generate a second persistent signal;

a mutual exclusive (MUTEX) circuit configured to:
arbitrate between the first persistent signal and the second persistent signal; and
output a grant signal to grant one of the first client and the second client to access the resource; and a control circuit configured to control an operation mode of the first asynchronous circuit and the second asynchronous circuit based on a control signal, a first grant signal indicating a grant status of the first request, a second grant signal indicating a grant status of the second request, the first persistent signal and the second persistent signal, wherein the control circuit comprises:

a NAND gate configured to receive an inverse of the control signal, the first persistent signal and the second persistent signal as inputs;

a C-element configured to receive the control signal and an output of the NAND gate as inputs;

a first two-level logic gate configured to:
receive the second persistent signal, the first grant signal and an output of the C-element as inputs; and
output a first operation mode control signal to control the first asynchronous circuit; and a second two-level logic gate configured to:
receive the first persistent signal, the second grant signal and the output of the C-element as inputs; and
output a second operation mode control signal to control the second asynchronous circuit.

7. The system of claim 6, wherein:
to sanitize the first non-persistent signal, the first asynchronous circuit is configured to:
in response to the first non-persistent signal being above a predefined threshold voltage for a predetermined amount of time, rise the first persistent signal to logic high; and
in response to the second non-persistent signal being above the predefined threshold voltage for the predetermined amount of time, rise the second persistent signal to logic high.

8. The system of claim 6, wherein a gate delay provided by the control circuit is at most three gate delays.

9. The system of claim 6, wherein:
in response to a rising transition of the first operation mode control signal, the first asynchronous circuit operates in a waiting mode;
in response to a falling transition of the first operation mode control signal, the first asynchronous circuit operates in a dormant mode;
in response to a rising transition of the second operation mode control signal, the second asynchronous circuit operates in the waiting mode; and
in response to a falling transition of the second operation mode control signal, the second asynchronous circuit operates in the dormant mode.

10. The system of claim 6, wherein the arbiter further comprises:
a first NOR gate configured to:
receive the first non-persistent signal and the second grant signal as inputs; and
in response to the first non-persistent signal failing to be above a predefined threshold voltage for a predetermined amount of time, reset the first asynchronous circuit; and a second NOR gate configured to:
receive the second non-persistent signal and the first grant signal as inputs; and
in response to the second non-persistent signal failing to be above the predefined threshold voltage for the predetermined amount of time, reset the second asynchronous circuit.

11. The system of claim 6, wherein the first client, the second client, the resource and the arbiter are parts of an asynchronous system.

12. A semiconductor device comprising:
N first asynchronous circuit configured to:
receive N non-persistent signals representing N requests; and
sanitize the N non-persistent signals to generate N persistent signals;

a mutual exclusive (MUTEX) circuit configured to:
arbitrate among the N persistent signals; and
output a grant signal to issue a grant to one of the N requests; and a control circuit configured to control an operation mode of the N asynchronous circuits based on a control signal, N grant signals indicating grant status of the N requests and the N persistent signals, the control circuit comprises:
a NAND gate configured to receive an inverse of the control signal and the N persistent signals as inputs;
a C-element configured to receive the control signal and an output of the NAND gate as inputs; and
N multi-level logic gates configured to output N operation mode control signals to control the N asynchronous circuits.

13. The semiconductor device of claim 12, wherein to sanitize a non-persistent signal among the N non-persistent signals, a corresponding asynchronous circuit among the N asynchronous circuits is configured to, in response to the non-persistent signal being above a predefined threshold voltage for a predetermined amount of time, rise the persistent signal to logic high.

14. The semiconductor device of claim 12, wherein a gate delay provided by the control circuit is at most three gate delays.

15. The semiconductor device of claim 12, wherein:
in response to rising transitions of the N operation mode control signals, the N asynchronous circuits operate in a waiting mode; and
in response to falling transitions of the N operation mode control signals, the N asynchronous circuits operate in a dormant mode.

16. The semiconductor device of claim 12, further comprising N NOR gates, wherein each one of the N NOR gates is configured to, in response to a corresponding non-persistent signal failing to be above a predefined threshold voltage for a predetermined amount of time, reset a corresponding asynchronous circuit.

17. The semiconductor device of claim 12, wherein the N multi-level logic gates are three-level logic gates, and the control circuit is configured to reset the N asynchronous circuits concurrently.

18. The semiconductor device of claim 12, wherein the N multi-level logic gates are two-level logic gates, and the control circuit is configured to reset the N asynchronous circuits sequentially.

* * * * *